(12) United States Patent
Kawakami et al.

(10) Patent No.: US 6,727,613 B2
(45) Date of Patent: Apr. 27, 2004

(54) MOTOR HAVING ROTATABLE SHAFT COUPLED WITH WORM SHAFT

(75) Inventors: Takenobu Kawakami, Toyohashi (JP); Keijiro Suzuki, Kosai (JP); Toshihiro Saitou, Toyohashi (JP); Tadashi Adachi, Kosai (JP); Hiroaki Yamamoto, Toyohashi (JP); Toshiyuki Masuda, Toyohashi (JP); Kouji Shibata, Kosai (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 10/120,543

(22) Filed: Apr. 12, 2002

(65) Prior Publication Data

US 2002/0158527 A1 Oct. 31, 2002

(30) Foreign Application Priority Data

Apr. 25, 2001 (JP) .......................................... 2001-127582
Apr. 27, 2001 (JP) .......................................... 2001-131523

(51) Int. Cl.[7] ................................................. H02K 7/00
(52) U.S. Cl. ........................ 310/75 R; 310/71; 310/180; 310/42; 310/89
(58) Field of Search ............................... 310/75 R, 71, 310/180, 42, 89; 180/44

(56) References Cited

U.S. PATENT DOCUMENTS

| | | | | |
|---|---|---|---|---|
| 5,090,261 A | * | 2/1992 | Naktsukasa | 74/89 |
| 6,215,209 B1 | * | 4/2001 | Yamamato | 310/42 |
| 6,242,824 B1 | * | 6/2001 | Torii | 310/42 |
| 6,288,464 B1 | * | 9/2001 | Torii | 310/78 |
| 6,491,131 B1 | * | 12/2002 | Appleyard | 180/444 |
| 6,550,599 B2 | * | 4/2003 | Kudou | 192/223 |
| 6,591,708 B2 | * | 7/2003 | Kobayashi | 74/446 |

* cited by examiner

Primary Examiner—Burton S. Mullins
Assistant Examiner—Iraj A. Mohandesi
(74) Attorney, Agent, or Firm—Posz & Bethards, PLC

(57) ABSTRACT

A driving-side rotator of a clutch has a connecting hole, within which a connecting portion of a rotatable shaft is loosely fitted while providing a space between the connecting hole and the connection portion. The connecting hole of the driving-side rotator is engageable with the connecting portion of the rotatable shaft in a rotational direction to integrally rotate with connecting portion of the rotatable shaft. Two positioning holes are provided in a brush holder, and two positioning projections are provided in a gear housing to allow direct positioning of the brush holder and the gear housing relative to each other.

29 Claims, 16 Drawing Sheets

MOTOR HAVING ROTATABLE SHAFT COUPLED WITH WORM SHAFT

CROSS REFERENCE TO RELATED APPLICATION

This application is based on and incorporates herein by reference Japanese Patent Application No. 2001-127582 filed on Apr. 25, 2001, Japanese Patent Application No. 2001-131523 filed on Apr. 27, 2001 and Japanese Patent Application No. 2002-008850 filed on Jan. 17, 2002.

BACKGROUND OF THE INVENTION

1. Field of the Invention

The present invention relates to a motor including a clutch, which couples a rotatable shaft of a rotor to a worm shaft.

2. Description of Related Art

With reference to FIG. 17, one previously proposed motor used, for example, in a power window system includes a motor main body 52, a speed reducing unit 54 and a clutch 55. The motor main body 52 rotates a rotatable shaft 51. The speed reducing unit 54 includes a worm shaft 53 and transmits rotational driving force of the worm shaft 53 to a load side (e.g., a door window glass side of the power window system). The clutch 55 is placed between the rotatable shaft 51 and the worm shaft 53.

With reference to FIG. 18, the clutch 55 includes a driving-side rotator 61, a driven-side rotator 62, a collar 63 and rolling elements 64. The driving-side rotator 61 is connected to a distal end of the rotatable shaft 51 to rotate integrally therewith. The driven-side rotator 62 is integrally connected to a base end of the worm shaft 53. The collar 63 surrounds both the driving-side rotator 61 and the driven-side rotator 62 and is secured to a gear housing 56 of the speed reducing unit 54. The rolling elements 64 are arranged between the driven-side rotator 62 and the collar 63. In the clutch 55, when the driving-side rotator 61 is rotated, each rolling element 64 is rotated together with the driving-side rotator 61 without being clamped between a corresponding control surface 62a of the driven-side rotator 62 and an inner peripheral surface 63a of the collar 63, and the driven-side rotator 62 is engaged with and is rotated by the driving-side rotator 61 in a rotational direction. On the other hand, when rotational force is applied to the driven-side rotator 62 from the load side (worm shaft 53 side) to rotate the driven-side rotator 62, each rolling element 64 is clamped between the corresponding control surface 62a of the driven-side rotator 62 and the inner peripheral surface 63a of the collar 63 to restrain the rotation of the driven-side rotator 62.

Thus, when the rotatable shaft 51 is rotated by the motor main body 52, the rotational driving force of the rotatable shaft 51 is transmitted to the worm shaft 53 through the clutch 55 to raise or lower the window glass. On the other hand, when load (e.g., weight of the window glass or vibrations of the window glass) is downwardly applied to the window glass to apply rotational force to the worm shaft 53, the rotation of the worm shaft 53 is restrained by the clutch 55 to restrain the unexpected downward movement of the window glass.

In order to properly operate the clutch 55, the driving-side rotator 61 and the driven-side rotator 62 are installed such that a rotational axis of the driving-side rotator 61 is aligned with a rotational axis of the driven-side rotator 62. Furthermore, a connecting hole 61a is formed in a central portion of the driving-side rotator 61 to extend in an axial direction. A connecting portion 51a formed in a distal end of the rotatable shaft 51 is press fitted into the connecting hole 61a of the driving-side rotator 61, so that the rotatable shaft 51 and the driving-side rotator 61 are connected to each other to rotate together. Thus, it is required to assemble the motor such that the central axis of the driving-side rotator 61 (connecting hole 61a) and the central axis of the rotatable shaft 51 are aligned with each other.

However, for example, due to a manufacturing error of each corresponding connecting portion, misalignment between the rotational axis of the driving-side rotator 61 and the rotational axis of the rotatable shaft 51 (e.g., tilt of the rotational axis of the rotatable shaft 51 relative to the rotational axis of the driving-side rotator 61, or radial displacement of the rotational axis of the rotatable shaft 51 relative to the rotational axis of the driving-side rotator 61, which extends parallel to the rotational axis of the rotatable shaft 51) can occur. When the misalignment occurs, relatively large radial loads are applied to the connection between the driving-side rotator 61 and the rotatable shaft 51. If the driving-side rotator 61 and the rotatable shaft 51 are rotated at this state, relatively large noises and vibrations are generated at the connection between the driving-side rotator 61 and the rotatable shaft 51.

SUMMARY OF THE INVENTION

The present invention addresses the above disadvantages. Thus, it is an objective of the present invention to provide a motor capable of reducing generation of noises and vibrations at a connection between a rotatable shaft of a rotor and a worm shaft.

To achieve the objective of the present invention, there is provided a motor including a motor main body, a speed reducing unit and a coupling means. The motor main body includes a rotatable shaft and rotates the rotatable shaft. The speed reducing unit is connected to the motor main body and includes a worm shaft. The worm shaft is substantially coaxial with the rotatable shaft. The coupling means couples the rotatable shaft with the worm shaft. The coupling means includes a driving-side rotator and a driven-side rotator. The driving-side rotator is connected with the rotatable shaft to rotate integrally with the rotatable shaft. The driven-side rotator is connected with the worm shaft to rotate integrally with the worm shaft and is engageable with the driving-side rotator in a rotational direction. The rotatable shaft includes a connecting portion. The driving-side rotator includes a connecting portion, which is loosely fitted with the connecting portion of the rotatable shaft and is engageable with the connecting portion of the rotatable shaft in the rotational direction to rotate integrally with the connecting portion of the rotatable shaft.

To achieve the objective of the present invention, there is also provided a motor including a motor main body, a brush holder, a speed reducing unit, a coupling means and a positioning means. The motor main body includes a yoke housing. The yoke housing rotatably receives an armature, which includes a rotatable shaft and a commutator. The brush holder is placed in an opening of the yoke housing. The brush holder holds a plurality of brushes in sliding contact with the commutator and includes a bearing, which rotatably supports the rotatable shaft. The speed reducing unit includes a gear housing connected to the yoke housing in such a manner that the brush holder is arranged between the opening of the gear housing and an opening of the yoke housing. The gear housing rotatably receives a worm shaft, which is substantially coaxial with the rotatable shaft. The coupling means couples the rotatable shaft with the worm shaft. The positioning means is placed between the brush holder and the gear housing for positioning the brush holder and the gear housing relative to each other.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings.

Figure 1:
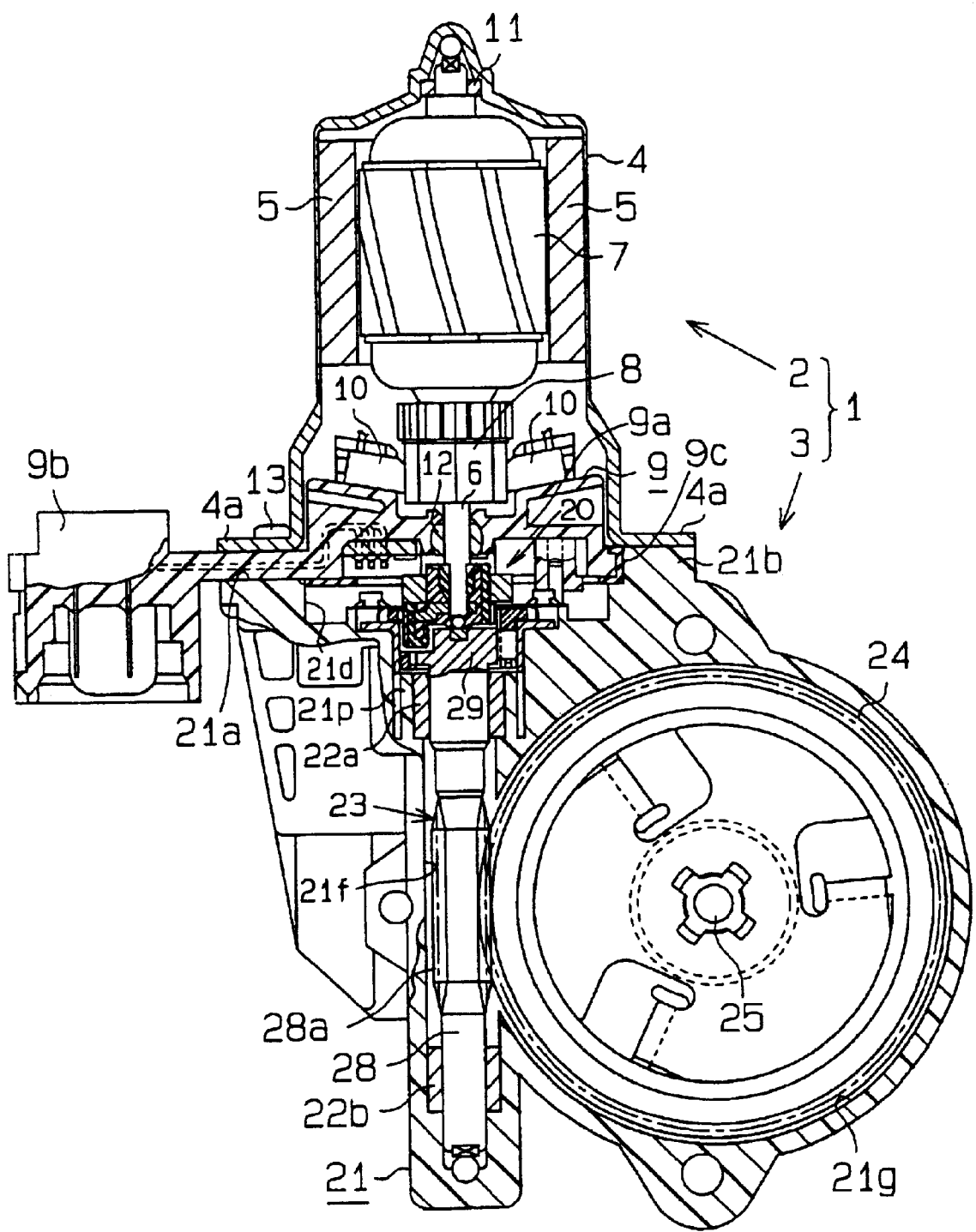
FIG. 1 is a cross-sectional view of a motor according to an embodiment of the present invention.

FIG. 1 is a schematic cross sectional view of a motor 1 used as a drive source of a power window system according to the present embodiment. The motor 1 includes a flat motor main body 2, a speed reducing unit 3 and a clutch (coupling means) 20.

As shown in FIG. 1, the motor main body 2 includes a yoke housing (hereinafter, simply referred to as a yoke) 4, a couple of magnets 5, a rotatable shaft 6, an armature 7, a commutator 8, a brush holder 9 and brushes 10.

Figure 2:
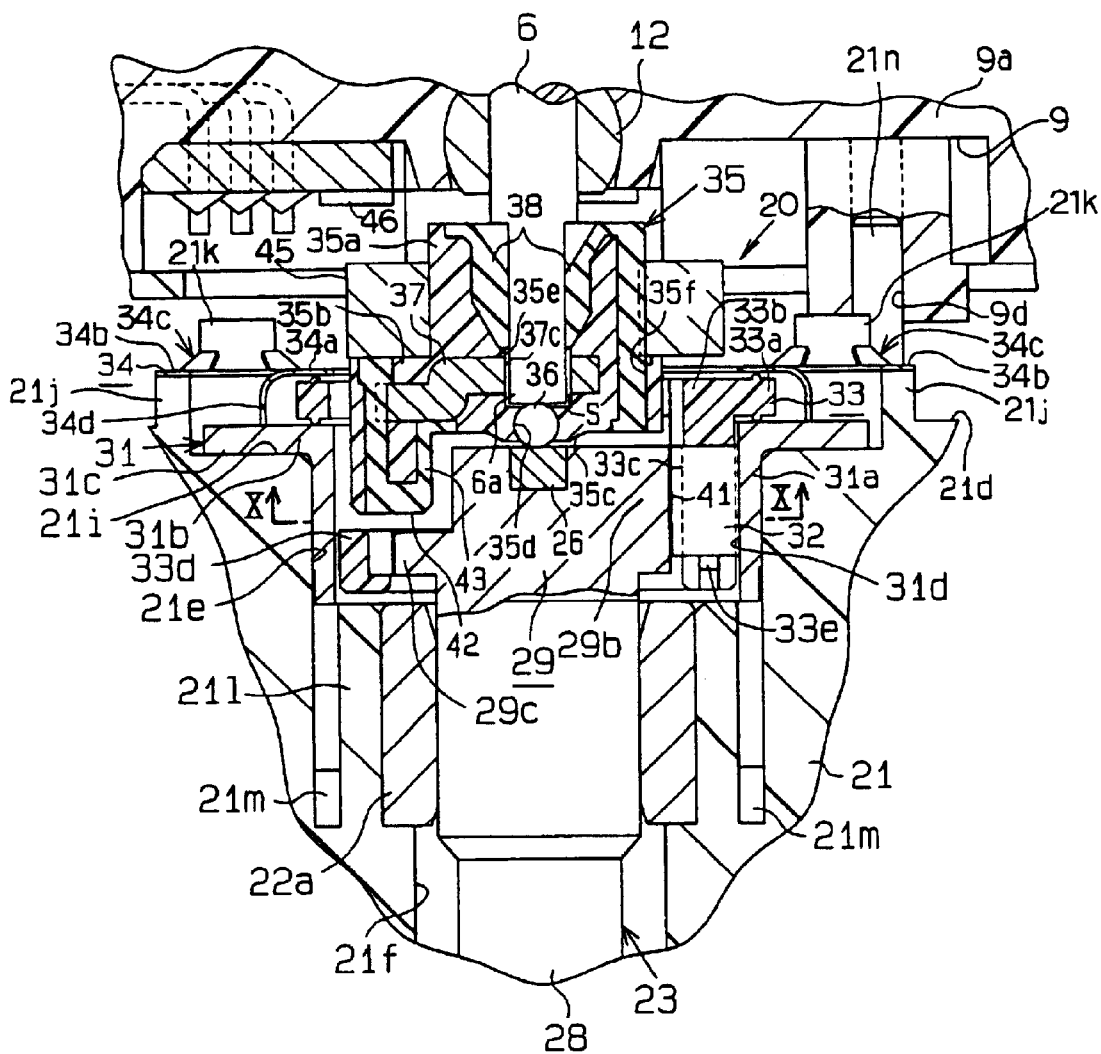
FIG. 2 is an enlarged partial cross sectional view of FIG. 1.
Figure 3:
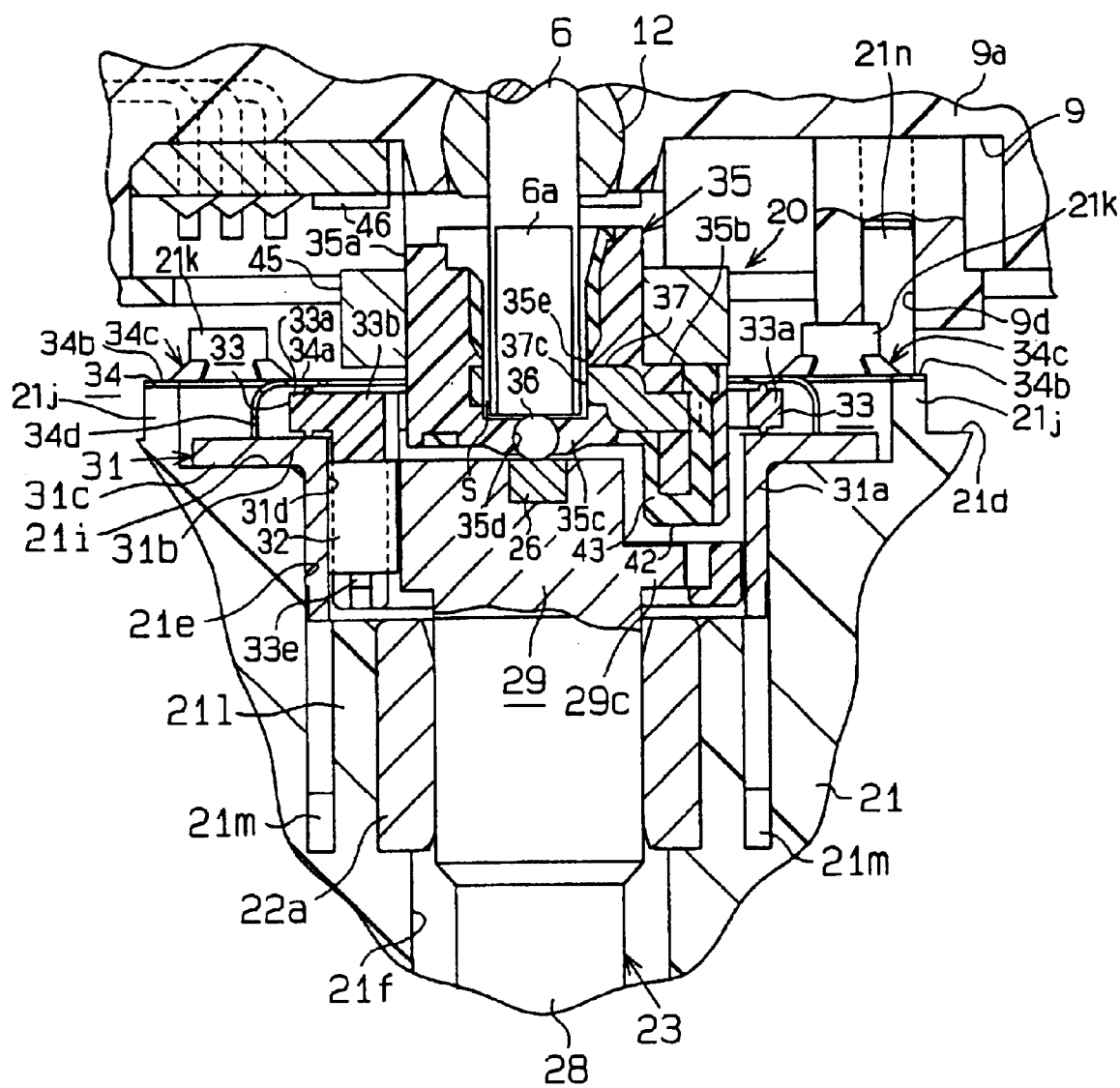
FIG. 3 is another enlarged partial cross sectional view of FIG. 1.
Figure 4:
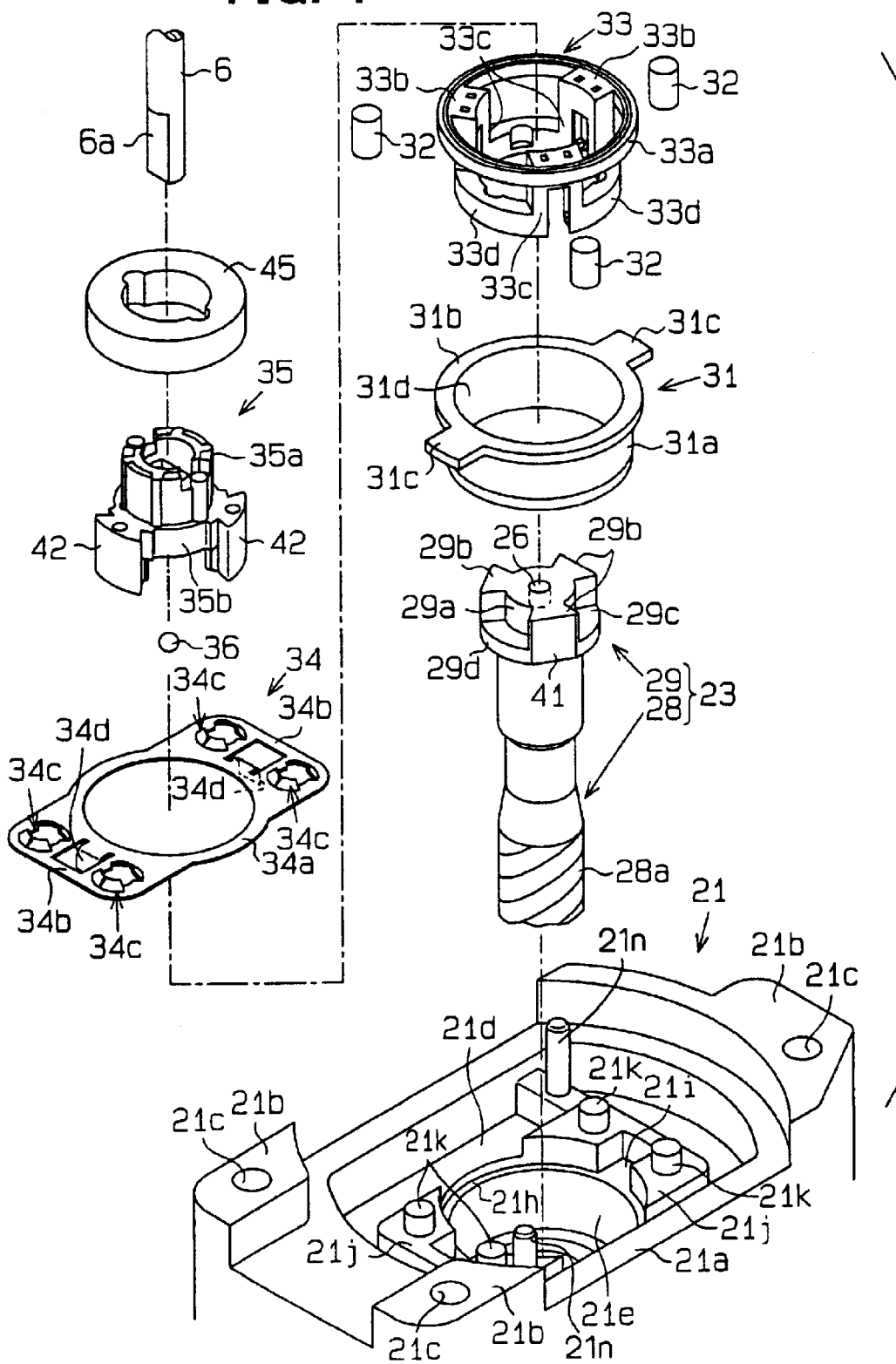
FIG. 4 is an exploded view showing a clutch of the motor.

The yoke 4 is shaped into a flat cup shape. The magnets 5 are secured to an inner peripheral surface of the yoke 4 and are opposed to each other. The armature 7 is arranged radially inward of the magnets 5 in the yoke 4. The armature 7 has the rotatable shaft 6. A base end of the rotatable shaft 6 is rotatably supported by a bearing 11 arranged at the bottom center of the yoke 4. The commutator 8 is secured to a predetermined distal end portion of the rotatable shaft 6. As shown in FIGS. 2 to 4, a connecting portion 6a, which has diametrically opposing flat outer wall surfaces, is formed at the distal end of the rotatable shaft 6.

At an open end (opening) of the yoke 4, two flanges 4a are formed to extend outwardly in a longitudinal direction of an elongated lateral cross-section of the yoke 4.

Furthermore, the brush holder 9 is received within and secured to the open end of the yoke 4. The brush holder 9 includes a holder main body 9a and a connector 9b. The holder main body 9a is configured to substantially cover the open end of the yoke 4. The connector 9b is formed integrally with the holder main body 9a and protrudes outwardly from the holder main body 9a in a radial direction of the yoke 4. The brushes 10 are supported by the holder main body 9a. The brushes 10 are electrically connected to the connector 9b through electrical lines (not shown) and are slidably engaged with the commutator 8. A bearing 12 is supported at the center of the holder main body 9a. An intermediate portion of the rotatable shaft 6, which is located between the commutator 8 and the connecting portion 6a, is rotatably supported by the bearing 12. With reference to FIG. 1, a clamp portion 9c extends along an entire outer peripheral edge of the holder main body 9a. The clamp portion 9c is clamped between the open end of the yoke 4 and an open end (opening) of a gear housing 21, which will be described below, along substantially an entire inner perimeter of the open end of the yoke 4. The clamp portion 9c is covered with an elastic seal member such that the seal member prevents penetration of water through the connection between the yoke 4 and the gear housing 21 when the clamp portion 9c is clamped therebetween. Furthermore, on the gear housing 21 side of the holder main body 9a, a couple of circular positioning holes 9d are provided radially inward of the clamp portion 9c at opposite diagonal corners, respectively, of the holder main body 9a. The positioning holes 9d are symmetrically arranged with respect the rotatable shaft 6 (i.e., each positioning hole 9d is equally spaced from the rotatable shaft 6) and penetrate through the holder main body 9a.

Electric power is supplied to the brushes 10 from an external power source through the connector 9b. When the electric power is supplied from the external power source to coil windings wound around the armature 7 through the brushes 10 and the commutator 8, the armature 7 (rotatable shaft 6), i.e., the motor main body 2 is rotated.

The speed reducing unit 3 includes the gear housing 21, bearings 22a, 22b, a worm shaft 23, a worm wheel 24 and an output shaft 25.

Figure 5:
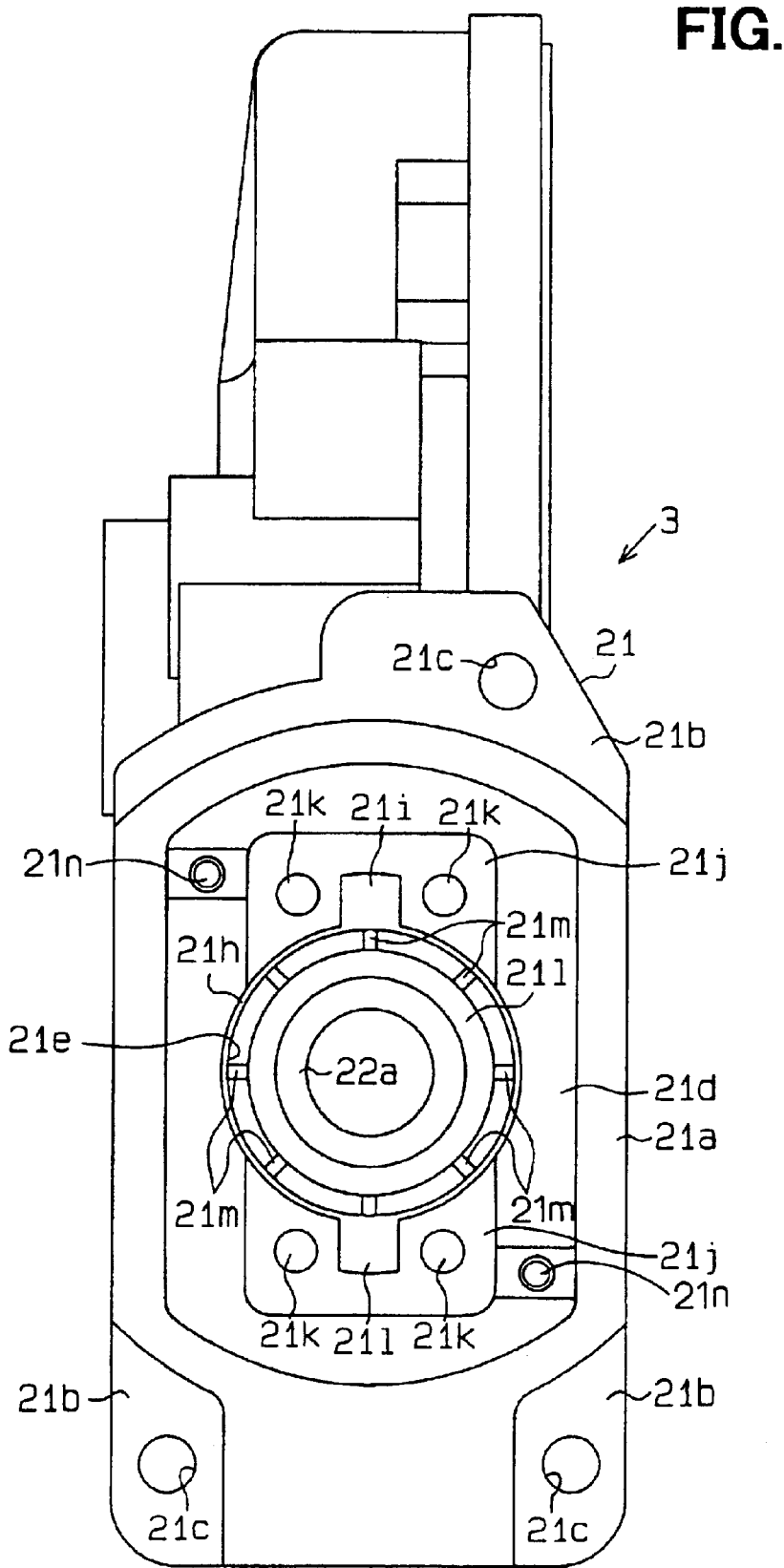
FIG. 5 is a plan view of a gear housing of the motor.

The gear housing 21 is made of a resin material. An open end (this open end is the top side in FIG. 1 and will be hereinafter referred as the top open end) of the gear housing 21, to which the motor main body 2 is secured, has a flat elongated cross section that corresponds with the open end of the yoke 4. With reference to FIGS. 4 and 5, at the top open end of the gear housing 21, there is formed an engaging recess 21a within which the holder main body 9a of the brush holder 9 is received. Securing portions 21b are formed around the engaging recess 21a in the top open end of the gear housing 21. The flanges 4a of the yoke 4 are secured to the securing portions 21b to secure the yoke 4 to the gear housing 21. Three screw receiving holes 21c are formed at three predetermined positions in the securing portions 21b. A nut (not shown) is received in each screw receiving hole 21c. The gear housing 21, which has the holder main body 9a securely fitted to the engaging recess 21a, is securely connected to the yoke 4 by inserting three screws 13 (only one is shown in FIG. 1) into the screw receiving holes 21c through screw receiving holes (not shown) formed in the flanges 4a of the yoke 4 and threadably tightening the screws 13 into the nuts received in the screw receiving holes 21c.

The gear housing 21 has a recess 21d that is recessed from a base of the engaging recess 21a at the center thereof. The recess 21d is elongated in a longitudinal direction of an elongated cross section of the engaging recess 21a. The gear housing 21 further includes a clutch receiving circular recess 21e and a worm shaft receiving portion 21f (FIGS. 2 and 3). The clutch receiving recess 21e is further recessed from a base of the recess 21d at the center thereof. The worm shaft receiving portion 21f is further recessed from a base of the clutch receiving recess 21e at the center thereof in the axial direction of the rotatable shaft 6. The gear housing 21 further includes a wheel receiving portion 21g. The wheel receiving portion 21g is communicated with the worm shaft receiving portion 21f in a direction perpendicular to an axial direction of the worm shaft receiving portion 21f at an axially middle portion of the worm shaft receiving portion 21f (i.e., the wheel receiving portion 21g is located on the right side of the worm shaft receiving portion 21f in FIG. 1).

With reference to FIG. 4, an annular flange engaging recess 21h is formed at an open end of the clutch receiving recess 21e. Opposed engaging recesses 21i extend continuously from the engaging recess 21h in the longitudinal direction of the elongated lateral cross-section of the recess 21d.

At the base of the recess 21d, two base portions 21j are formed. Each base portion 21j is formed to surround the corresponding engaging recess 21i. That is, each base portion 21j is horseshoe-shaped and has a peripheral wall surface that is continuous with a wall surface of the engaging recess 21i. Each base portion 21j has opposite ends that are located adjacent to the lateral end sides of the lateral cross-section of the recess 21d, respectively. Cylindrical engaging projections 21k are formed in top surfaces of the opposite ends, respectively, of each base portion 21j.

With reference to FIGS. 2 and 3, a bearing support portion 21l protrudes from the base of the clutch receiving recess 21e. The cylindrical bearing support portion 21l is flexible in a direction perpendicular to the axial direction. The bearing support portion 21l is shaped into a generally cylindrical shape and has an inner diameter, which is larger than an inner diameter of the worm shaft receiving portion 21f, and an outer diameter, which is smaller than an inner diameter of the clutch receiving recess 21e. Furthermore, the bearing support portion 21l generally extends to the center of the clutch receiving recess 21e in the axial direction. As shown in FIGS. 2, 3 and 5, eight ribs 21m are arranged at equal angular intervals (45 degrees) along an outer peripheral surface of the bearing support portion 21l at the base end thereof. The ribs 21m are connected to an inner peripheral surface of the clutch receiving recess 21e.

The bearings 22a, 22b are radial bearings made of a metal material (metal bearings). The bearing 22a is received in the bearing support portion 21l. An inner diameter of the bearing 22a is smaller than the inner diameter of the worm shaft receiving portion 21f. The bearing 22b is engaged with an inner peripheral surface of a base portion (bottom side in FIG. 1) of the worm shaft receiving portion 21f.

A couple of cylindrical positioning projections 21n are provided in the base of the recess 21d of the gear housing 21 in opposed relationship to the positioning holes 9d, respectively, of the brush holder 9. Each positioning projection 21n extends in the axial direction and is engaged with the corresponding positioning hole 9d. When the positioning projections 21n are engaged with the positioning holes 9d, respectively, the brush holder 9 and the gear housing 21 are positioned relative to each other. That is, in the present embodiment, the positioning projections 21n and the positioning holes 9d constitute a positioning means. As described above, the clamp portion 9c of the brush holder 9 is received in the engaging recess 21a of the gear housing 21. However, the clamp portion 9c is covered with the elastic seal member, so that the clamp portion 9c cannot achieve accurate positioning. Thus, in the present embodiment, the brush holder 9 and the gear housing 21 are positioned relative to each other by the positioning projections 21n of the gear housing 21 and the positioning holes 9d of the brush holder 9. As a result, accumulation of errors between the rotatable shaft 6 and the worm shaft 23 is reduced, so that misalignment between a rotational axis of the rotatable shaft 6 and a rotational axis of the worm shaft 23 (e.g., tilt of the rotational axis of the rotatable shaft 6 relative to the rotational axis of the worm shaft 23, or radial displacement of the rotational axis of the rotatable shaft 6 relative to the rotational axis of the worm shaft 23, which extends parallel to the rotational axis of the rotatable shaft 6) is more effectively reduced.

The worm shaft 23 is made of a metal material and includes a worm shaft main body 28 and a driven-side rotator 29 that is integrally formed with the worm shaft main body 28 on a motor main body 2 side of the worm shaft main body 28, as shown in FIG. 4. The worm shaft main body 28 has a worm 28a in the axially middle part thereof. Furthermore, the worm shaft main body 28 is rotatably supported by the bearings 22a, 22b at the opposite ends thereof and is received within the worm shaft receiving portion 21f. A contact member 26 is provided in a motor main body 2 side end surface (end surface of the driven-side rotator 29) of the worm shaft 23 at a position where a ball 36 (described below) contacts the worm shaft 23. The contact member 26 makes a point contact with the ball 36. Thus, the contact member 26 is made of a metal material (hardened metal material) having rigidity higher than the rest of the worm shaft 23 to restrain excessive wearing of the contact portion of the contact member 26, which contacts the ball 36.

The worm wheel 24 is meshed with the worm 28a and is received within the wheel receiving portion 21g in such a manner that the worm wheel 24 is allowed to rotate about its rotational axial, which extends in a direction (direction perpendicular to the drawing surface in FIG. 1) perpendicular to the worm shaft 23. The output shaft 25 is connected to the worm wheel 24 in such a manner that the output shaft 25 coaxially rotates with the worm wheel 24 when the worm wheel 24 is rotated. The output shaft 25 is drivingly connected to a known window regulator (not shown) for raising and lowering a window glass.

Figure 6A:
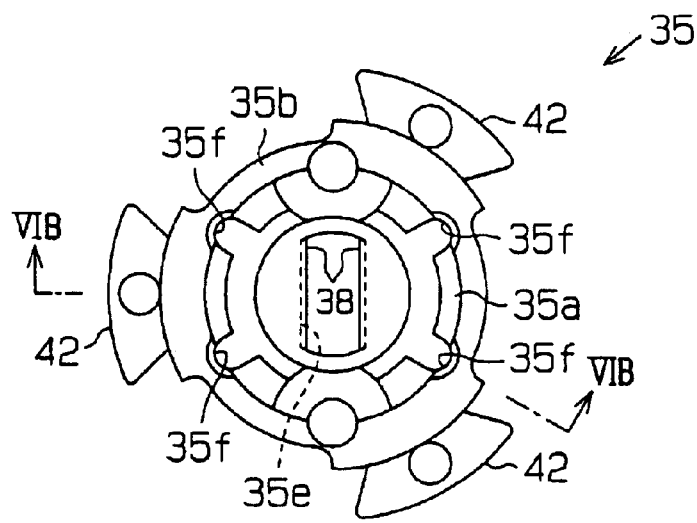
FIG. 6A is a plan view of a driving-side rotator of the motor.
Figure 6B:
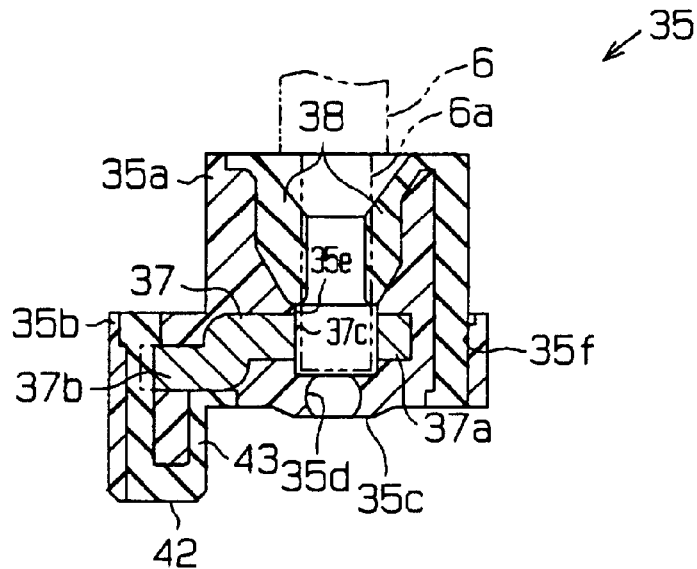
FIG. 6B is a cross sectional view taken along line VIB—VIB in FIG. 6A.
Figure 6C:
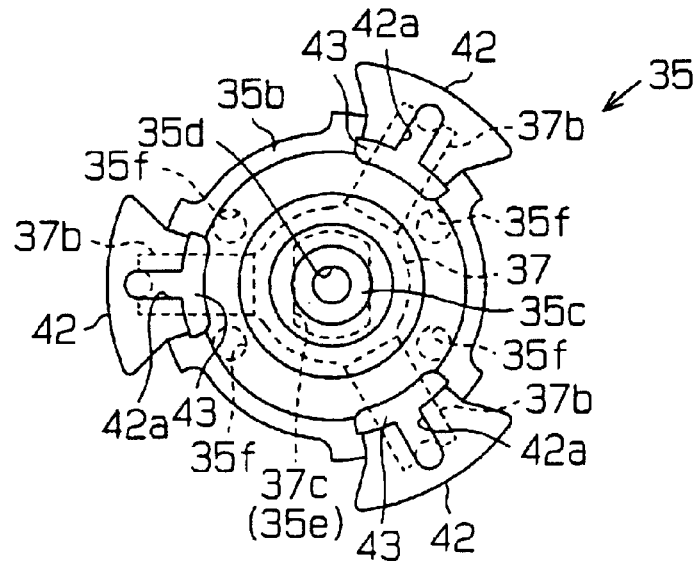
FIG. 6C is a bottom view of the driving-side rotator shown in FIGS. 6A and 6B.
Figure 7A:
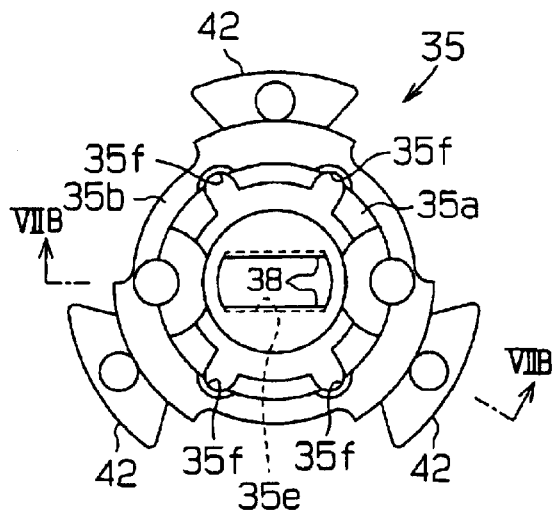
FIG. 7A is another plan view of the driving-side rotator.
Figure 7B:
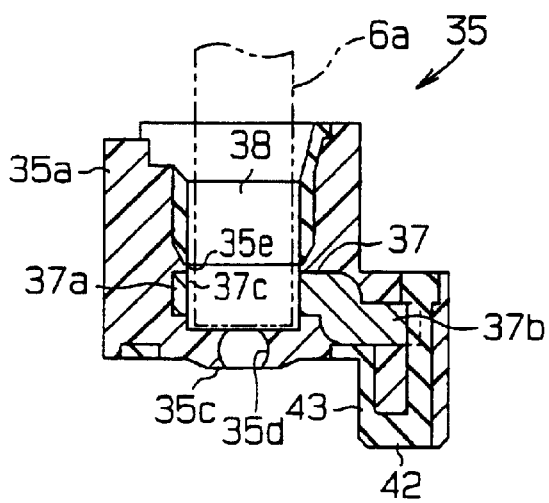
FIG. 7B is a cross-sectional view taken along line VIIB—VIIB in FIG. 7A.
Figure 7C:
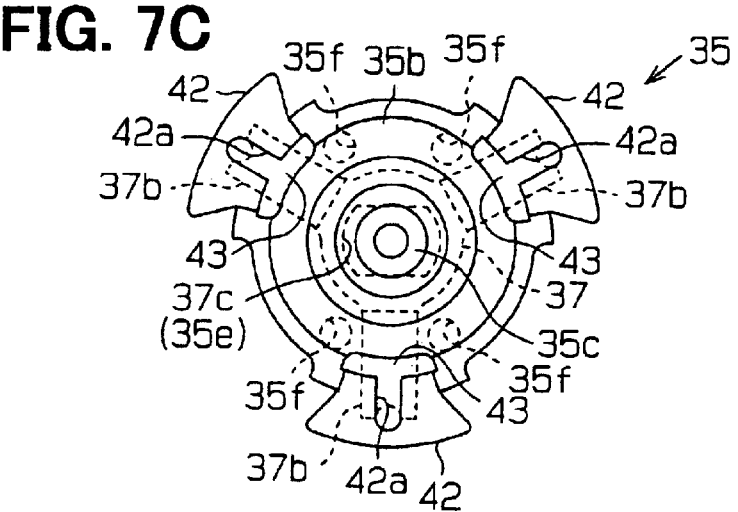
FIG. 7C is a bottom view of the driving-side rotator shown in FIGS. 7A and 7B.

The rotatable shaft 6 is connected to the worm shaft 23 via the clutch 20. As shown in FIGS. 2 to 4, the clutch 20 includes the driven-side rotator 29, a collar 31, a plurality (three in this embodiment) of rolling elements 32, a support member 33, a stopper 34, a driving-side rotator 35 and the ball 36. FIG. 3 shows the structure around the rotatable shaft 6, which is rotated 90 degrees with respect to the rotatable shaft 6 shown in FIG. 2. FIG. 2 is a cross-sectional view corresponding to FIG. 6B, which is a cross-sectional view taken along line VIB—VIB in FIG. 6A (i.e., FIG. 2 also shows the cross-sectional view taken along line VIB—VIB in FIG. 6A). FIG. 3 is a cross-sectional view corresponding to FIG. 7B, which is a cross-sectional view taken along line VIIB—VIIB in FIG. 7A (i.e., FIG. 3 also shows the cross-sectional view taken along line VIIB—VIIB in FIG. 7A).

The collar 31 includes a cylindrical outer ring 31a, an annular flange portion 31b and a couple of engaging portions 31c. The annular flange portion 31b extends radially outwardly from one end (upper end in FIGS. 2 to 4) of the cylindrical outer ring 31a. The engaging portions 31c are angularly spaced 180 degrees apart from each other and protrude radially outwardly from the flange portion 31b. The outer ring 31a of the collar 31 is fitted within the clutch receiving portion 21e. The flange portion 31b of the collar 31 is fitted to the flange engaging recess 21h. The engaging portions 31c are fitted within the engaging recesses 21i, respectively, so that rotation of the collar 31 is prevented. The other end (lower end in FIGS. 2 and 3) of the outer ring 31a of the collar 31 is inserted to a point near a distal end of the bearing support portion 21l (top end in FIGS. 2 and 3) and does not interfere with the flexing of the bearing support portion 21l. The driven-side rotator 29 is positioned inward of the outer ring 31a.

Figure 10:
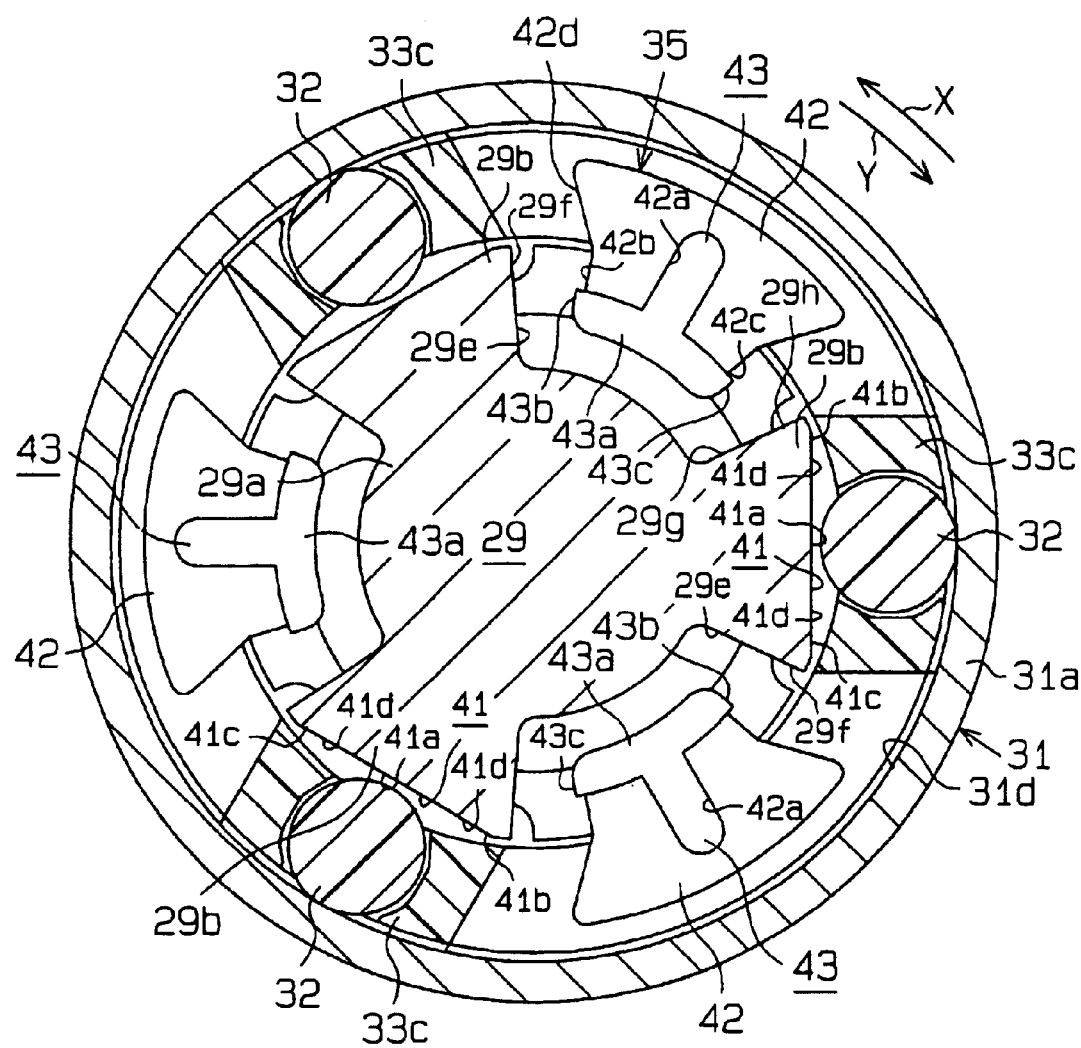
FIG. 10 is a cross sectional view taken along line X—X in FIG. 2.

As shown in FIG. 4, the driven-side rotator 29 includes a shaft portion 29a and three engaging projections 29b. The shaft portion 29a extends coaxially from a base end of the worm shaft main body 28 on the motor main body 2 side (rotatable shaft 6 side). The engaging projections 29b extend radially outwardly from the shaft portion 29a and are arranged at substantially equal angular intervals (about 120 degrees). Each engaging projection 29b has a progressively increasing circumferential width that increases toward a radially outer end thereof. As shown in FIG. 10, which is a cross sectional view taken along line X—X in FIG. 2, a radially outer surface of each engaging projection 29b constitutes a control surface 41. Each control surface 41 is spaced from an inner peripheral surface 31d of the outer ring 31a of the collar 31 for a distance that varies in a rotational direction or circumferential direction. Each control surface 41 of the present embodiment is a flat surface that is spaced from the collar 31 for a distance that decreases toward each circumferential end of the control surface 41. As shown in FIG. 4, the driven-side rotator 29 includes reinforcing ribs 29c for reinforcing the engaging projections 29b. Each reinforcing rib 29c is formed to connect circumferentially opposed lateral surfaces of each circumferentially adjacent pair of engaging projections 29b.

Each rolling element 32 is made of a resin material and is shaped into a generally cylindrical shape. Furthermore, as shown in FIG. 10, each rolling element 32 is arranged between the control surface 41 of the corresponding engaging projection 29b and the inner peripheral surface 31d of the collar 31. An outer diameter of the rolling element 32 is smaller than a distance between a center portion (circumferential center) 41a of the control surface 41 and the inner peripheral surface 31d of the collar 31 but is longer than a distance between each of end portions (circumferential ends) 41b, 41c of the control surface 41 and the inner peripheral surface 31d of the collar 31. That is, the outer diameter of the rolling element 32 is equal to a distance between the inner peripheral surface 31d of the collar 31 and each intermediate portion 41d located between the center portion 41a and each circumferential end 41b or 41c.

The support member 33 rotatably supports the rolling elements 32 in such a manner that the rolling elements 32 are arranged parallel to one another at substantially equal angular intervals. More specifically, with reference to FIGS. 2 to 4, the support member 33 is made of a resin material and includes a ring 33a, three inward protrusions 33b, three pairs of roller supports 33c and three connectors 33d. The ring 33a is formed into an annular shape having an outer diameter larger than that of the outer ring 31a. The inward protrusions 33b extend radially inwardly from an inner peripheral surface of the ring 33a and are circumferentially arranged at substantially equal angular intervals. Each pair of roller supports 33c is provided to each inward protrusion 33b. The paired roller supports 33c extend axially from circumferential ends, respectively, of the corresponding inward protrusion 33b at a radially inward region of the inward protrusion 33b. Each connector 33d is formed into an arcuate shape that connects one roller support 33c of one pair to the following roller support 33c of the next pair. In each pair of roller supports 33c, two circumferentially opposing engaging projections 33e are formed in distal ends of the roller supports 33c. Each rolling element 32 is held between the paired roller supports 33c and also between the inward protrusion 33b and the opposing engaging projections 33e in such a manner that the rolling element 32 is immovably held with respect to the ring 33a in a circumferential direction and also in an axial direction. The support member 33, which holds the rolling elements 32 in the above-described manner, is positioned such that each roller support 33c is inserted into the inside of the outer ring 31a to position each rolling element 32 between the corresponding control surface 41 and the inner peripheral surface 31d of the collar 31, and the ring 33a abuts against the flange portion 31b in the axial direction.

The stopper 34 is made of a metal plate having a generally uniform thickness throughout it. The stopper 34 includes an annular engaging part 34a and a pair of extended parts 34b. An inner diameter of the engaging part 34a is substantially equal to the inner diameter of the ring 33a of the support member 33. The extended parts 34b are angularly spaced 180 degrees apart from each other and protrude radially outwardly from the engaging part 34a. With reference to FIGS. 2 and 3, an inner diameter and the outer diameter of the engaging part 34a are substantially the same as the inner diameter and the outer diameter, respectively, of the cylindrical outer ring 31a of the collar 31. Each extended part 34b includes securing portions 34c. The securing portions 34c are provided at four corners, respectively, of the stopper 34 in such a manner that positions of the securing portions 34c correspond to the positions of the corresponding engaging projections 21k, respectively, of the gear housing 21. The engaging projections 21k are inserted into the securing portions 34c, respectively, to secure the stopper 34 to the gear housing 21. The engaging part 34a of the stopper 34 is placed over the ring 33a of the support member 33 (placed at the top side in FIG. 1). Once the ring 33a of the support member 33 abuts against the engaging part 34a of the stopper 34, the stopper 34 prevents axial movement of each rolling element 32 in cooperation with the support member 33. With reference to FIGS. 2 to 4, each extended part 34b has a limiting portion 34d at the center thereof. Each limiting portion 34d is formed by cutting the corresponding center portion of the extended part 34b and then bending it obliquely. A distal end of each limiting portion 34d abuts against the corresponding engaging portion 31c of the collar 31 to restrain the axial movement of the collar 31.

The driving-side rotator 35 includes a shaft portion 35a, a disk portion 35b and a ball holding portion 35c. The disk portion 35b has an outer diameter larger than that of the shaft portion 35a. The ball holding portion 35c is formed in the center of the disk portion 35b. A ball receiving recess 35d for holding the ball 36 is formed in the ball holding portion 35c. The ball 36 is held in the ball receiving recess 35d in such a manner that the ball 36 partially protrudes from the ball receiving recess 35d in both axial directions and is engaged with an end surface of the rotatable shaft 6 at one axial end and with the end surface of the worm shaft 23 (contact member 26) at the opposite axial end. Similar to the contact member 26, the ball 36 is made of a hardened metal material to achieve the higher rigidity.

A connecting hole 35e axially extends through the axial center of the driving-side rotator 35 from a base end (top end in FIGS. 2 and 3) of the shaft portion 35a to the ball holding portion 35c. The connecting hole 35e acts as a connecting portion and has two diametrically opposing flat inner wall surfaces. The connecting portion 6a of the rotatable shaft 6 is loosely fitted within the connecting hole 35e. That is, a size of the connecting hole 35e is larger than a size of the connecting portion 6a of the rotatable shaft 6 by a predetermined amount, so that a space S is formed between the connecting hole 35e and the connecting portion 6a of the rotatable shaft 6. The driving-side rotator 35 is drivingly connected to the rotatable shaft 6 to rotate together by loosely fitting the connecting portion 6a of the rotatable shaft 6 within the connection hole 35e.

Since the connecting portion 6a of the rotatable shaft 6 is loosely fitted within the connecting hole 35e, a certain amount of misalignment between the rotational axis of the driving-side rotator 35 and the rotational axis of the rotatable shaft 6 (e.g., tilt of the rotational axis of the rotatable shaft 6 relative to the rotational axis of the driving-side rotator 35, or radial displacement of the rotational axis of the rotatable shaft 6 relative to the rotational axis of the driving-side rotator 35, which extends parallel to the rotational axis of the rotatable shaft 6) is permitted at the assembly of the motor. Thus, application of relatively large radial loads to the connection between the driving-side rotator 35 and the rotatable shaft 6 is restrained. Furthermore, even when the worm shaft 23 is flexed during its rotation to cause tilt of the driving-side rotator 35, which in turn results in the misalignment between the rotational axis of the driving-side rotator 35 and the rotational axis of the rotatable shaft 6, application of the relatively large radial loads to the connection between the driving-side rotator 35 and the rotatable shaft 6 is also effectively restrained. As a result, generation of noises and vibrations at the connection between the driving-side rotator 35 and the rotatable shaft 6 during the rotation is effectively restrained. When the rotational axis of the rotatable shaft 6 is tilted relative to the rotational axis of the driving-side rotator 35, the end surface of the rotatable shaft 6 makes the point contact with the ball 36, so that the rotatable shaft 6 can easily follow the driving-side rotator 35.

The driving-side rotator 35 of the present embodiment is formed by insert molding a metal plate 37 within a resin body having a shape generally corresponding to the shape of the driving-side rotator 35. Then, an elastomer material is integrally molded to the resin body to form a resilient holding portion 38 and cushion members 43, which will be described later.

Figure 8:
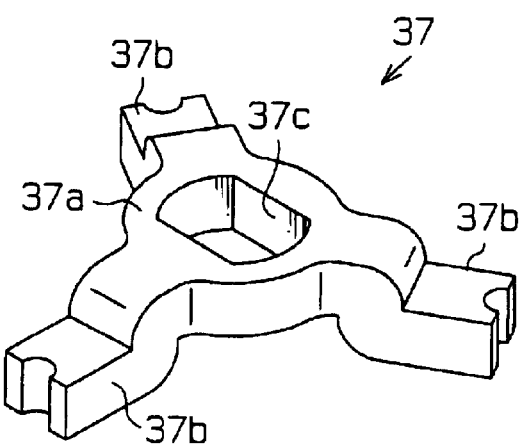
FIG. 8 is a perspective view of a metal place of the motor.

As shown in FIG. 8, the metal plate 37 has a disk portion 37a and three arm portions 37b. The disk portion 37a of the metal plate 37 is insert molded within the disk portion 35b of the driving-side rotator 35. Each arm portion 37b extends radially outwardly from the disk portion 37a to a corresponding protrusion 42, which will be described later. The metal plate 37 is inserted within the driving-side rotator 35b to improve the rigidity of the driving-side rotator 35, particularly the rigidity of each protrusion 42, which is engaged with the driven-side rotator 29 to transmit driving force to the driven-side rotator 29, and also the rigidity of the connecting hole 35e, which is connected with the connecting portion 6a of the rotatable shaft 6 to transmit driving force from the rotatable shaft 6 to the driving-side rotator 35.

A connecting hole 37c is formed in the center of the disk portion 37a of the metal plate 37. The connecting hole 37c acts as an engaging hole and is disposed in the connecting hole 35e. A cross sectional shape of the connecting hole 37c substantially coincides with that of the connecting hole 35e. An inner peripheral surface of the connecting hole 37c is flush with an inner peripheral surface of the connecting hole 35e. The driving-side rotator 35 is molded by pouring a resin material in a molding die (not shown). In this process, the metal plate 37 is previously positioned in the molding die before the resin material is poured into the molding die. The connecting hole 37c is used to position the metal plate 37 in the molding die.

The connecting hole 35e, in which the connecting hole 37c of the metal plate 37 is disposed, is engaged with the connecting portion 6a of the rotatable shaft 6 in the rotational direction. Although the axial size of the connecting hole 35e is relatively small, the rigidity of the connecting hole 35e is increased by the metal plate 37. Thus, the rotational driving force transmitted from the rotatable shaft 6 can be effectively conducted to the driving-side rotator 35 while the axial size of the driving-side rotator 35 is minimized. Furthermore, because of the relatively short axial size of the connecting hole 35e, an allowed tilt angle of the rotatable shaft 6 relative to the driving-side rotator 35 is increased. Thus, even when the tilt angle of the rotatable shaft 6 becomes relatively large, it is relatively easy to counteract this.

The resilient holding portion 38, which is made of a resilient elastomer material, is integrally molded to the driving-side rotator 35 such that the resilient holding portion 38 continuously extends from an open end of the connecting hole 35e. A space between the opposite inner wall surfaces located at an open end (top end in FIG. 6B) of the shaft portion 35a, which has the integrally molded resilient holding portion 38, is larger than that of the connecting hole 35e. As shown in FIGS. 6A to 7C, a space between the opposite inner wall surfaces (left and right wall surfaces in FIG. 6B) of the resilient holding portion 38 located adjacent to the opposite flat inner wall surfaces (left and right wall surfaces in FIG. 6B) of the connecting hole 37c of the metal plate 37 is smaller than a space between the opposite flat inner wall surfaces of the connecting hole 37c of the metal plate 37. Thus, the resilient holding portion 38 is resiliently engaged with the flat outer wall surfaces of the connecting portion 6a of the rotatable shaft 6. As a result, when the driving-side rotator 35 is installed to the rotatable shaft 6 during the assembly of the motor 1, the driving-side rotator 35 is resiliently held around the rotatable shaft 6 by the resilient holding portion 38 and thus is restrained from falling off the rotatable shaft 6, thereby accelerating the assembling operation of the motor 1. As described above, even if the misalignment between the rotational axis of the driving-side rotator 35 and the rotational axis of the rotatable shaft 6 occurs, the resilient holding portion 38 is resiliently deformed without any adverse effects.

As shown in FIGS. 4 and 6A to 7C, a plurality (three in this embodiment) of generally fan-shaped protrusions 42, which extend radially outwardly and also extend in the axial direction, are arranged at substantially equal angular intervals on the distal end side (bottom side in FIG. 2) of the disk portion 35b of the driving-side rotator 35. Each protrusion 42 includes an arcuate outer surface, which circumferentially extends along the inner peripheral surface 31d of the collar 31. The arcuate outer surface of each protrusion 42 extends along an arc whose diameter is slightly smaller than the inner diameter of the inner peripheral surface 31d of the collar 31, as shown in FIG. 10. That is, the driving-side rotator 35 is constructed such that the protrusions 42 can be inserted in the axial direction through the central through hole of the engaging part 34a of the stopper 34. In each protrusion 42, a coupling groove 42a (FIG. 10) extends halfway from an inner peripheral surface of each protrusion 42 in a radially outward direction. Each protrusion 42 is circumferentially arranged between the adjacent engaging projections 29b and also between the adjacent rolling elements 32 (roller supports 33c) within the outer ring 31a.

The cushion member 43 made of the elastomer material is integrally molded to the coupling groove 42a of each protrusion 42. The cushion members 43 are connected to the resilient holding portion 38 via through holes 35f (FIGS. 2 and 6) formed at predetermined positions in the resin portion of the driving-side rotator 35. A cushion segment 43a is formed in the cushion member 43. Each cushion segment 43a extends radially inwardly from the coupling groove 42a of each protrusion 42 and also extends in the circumferential direction. As shown in FIG. 10, a circumferential width of each cushion segment 43a is slightly longer than a circumferential width of the inner peripheral surface of the corresponding protrusion 42.

One side surface (counter-clockwise side surface) 43b of each cushion segment 43a engages a first cushion surface 29e, which is formed at a radially inward region of a clockwise side surface of the engaging projection 29b, when the driving-side rotator 35 is rotated to a predetermined position in the counter-clockwise direction (the direction of an arrow X) relative to the driven-side rotator 29. One side surface (counter-clockwise side surface) 42b, which is formed at a radially inward region of the protrusion 42, engages a first engaging surface 29f, which is formed at a radially outward region of the clockwise side surface of the engaging projection 29b, when the driving-side rotator 35 is further rotated in the counter-clockwise direction (the direction of the arrow X) beyond the predetermined position. Since the cushion segment 43a is deformed in the circumferential direction, the driving-side rotator 35 is allowed to rotate beyond the predetermined position in the counter-clockwise direction (the direction of the arrow X), as shown in FIG. 11.

The other side surface (counter-clockwise side surface) 43c of each cushion segment 43a engages a second cushion surface 29g, which is formed at a radially inward region of a counter-clockwise side surface of the engaging projection 29b, when the driving-side rotator 35 is rotated to a predetermined position in the clockwise direction (direction of an arrow Y) relative to the driven-side rotator 29. The other side surface (clockwise side surface) 42c formed at the radially inward region of the protrusion 42 engages a second engaging surface 29h, which is formed at a radially outward region of the counter-clockwise side surface of the engaging projection 29b, when the driving-side rotator 35 is further rotated in the clockwise direction (the direction of the arrow Y) beyond the predetermined position. Since the cushion segment 43a is deformed in the circumferential direction, the driving-side rotator 35 is allowed to rotate beyond the predetermined position in the clockwise direction (the direction of the arrow Y).

Figure 11:
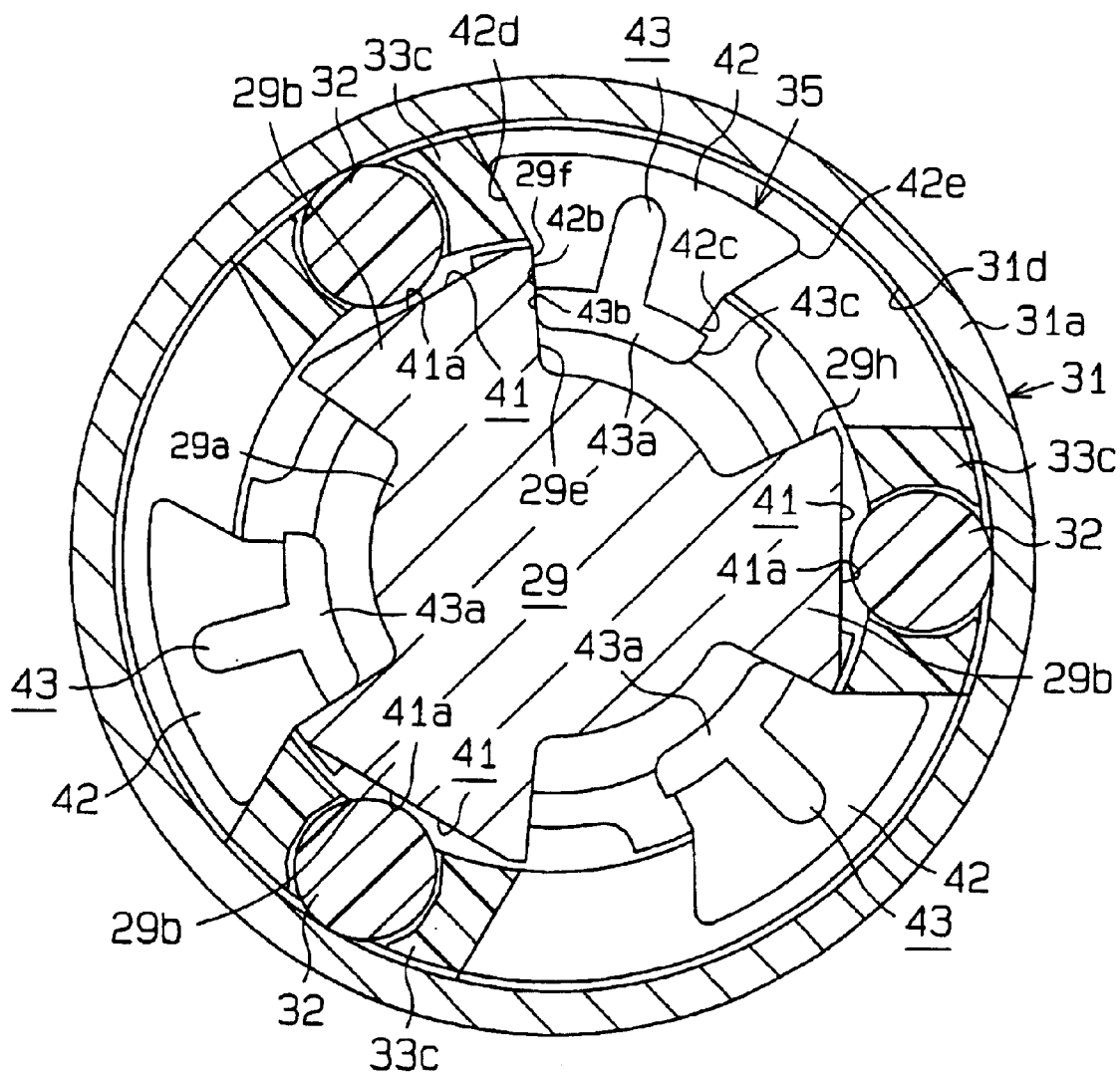
FIG. 11 is a schematic cross sectional view showing operation of the clutch.

With reference to FIG. 11, each component 32, 42, 29b, 33c is configured in the following manner. That is, each rolling element 32 is placed at the center portion 41a of the corresponding control surface 41 when the one side surface 42b of the corresponding protrusion 42 engages the first engaging surface 29f of the engaging projection 29b, and a first urging surface 42d formed at the radially outward region of the counter-clockwise side surface of the protrusion 42 engages the corresponding roller support 33c (FIG. 11).

An annular sensor magnet 45 is secured around the shaft portion 35a of the driving-side rotator 35. The annular sensor magnet 45 has a plurality of north poles and a plurality of south poles alternately arranged in a circumferential direction of the annular sensor magnet 45. A magnetic sensing element 46, such as a Hall element or a magneto-resistive element, is provided in the brush holder 9 near the sensor magnet 45. The magnetic sensing element 46 measures a change in magnetic field during rotation of the sensor magnet 45 to measure a rotational speed of the rotatable shaft 6, which rotates together with the driving-side rotator 35.

In the motor 1 of the power window system, when the motor main body 2 is driven to rotate the rotatable shaft 6 in the counter clockwise direction (the direction of the arrow X) in FIG. 10, the driving-side rotator 35 (protrusions 42) rotates integrally with the rotatable shaft 6 in the same direction (the direction of the arrow X). As shown in FIG. 11, when the one side surface 42b of the corresponding protrusion 42 engages the first engaging surface 29f of the engaging projection 29b, and the first urging surface 42d of the protrusion 42 engages the corresponding roller support 33c, the corresponding rolling element 32 is placed at the center portion 41a of the corresponding control surface 41 (this position is hereinafter referred to as a "neutral position"). In this case, the one side surface 43b of each cushion segment 43a first engages the first cushion surface 29e of the engaging projection 29b before the one side surface 42b of the protrusion 42 engages the first engaging surface 29f of the engaging projection 29b, resulting in reduced shocks at the time of engagement.

At this neutral position, each rolling element 32 is not clamped between the corresponding control surface 41 of the engaging projection 29b and the inner peripheral surface 31d of the collar 31, so that the driven-side rotator 29 is allowed to rotate relative to the collar 31. Thus, when the driving-side rotator 35 is further rotated in the counter-clockwise direction, the rotational force of the driving-side rotator 35 is transmitted to the driven-side rotator 29 via the protrusions 42, so that the driven-side rotator 29 is rotated along with the driving-side rotator 35. At this time, the rotational force is applied to each roller support 33c (support member 33) from the first urging surface 42d of the corresponding protrusion 42 in the same direction (the direction of the arrow X), so that the roller supports 33c (support member 33) are rotated together with the rolling elements 32 in the same direction.

Alternatively, when the rotatable shaft 6 is rotated in the clockwise direction (the direction of the arrow Y) in FIG. 10, each rolling element 32 is positioned in the neutral position by the corresponding protrusion 42. At this neutral position, each rolling element 32 is not clamped between the corresponding control surface 41 of the engaging projection 29b and the inner peripheral surface 31d of the collar 31, so that the driven-side rotator 29 is allowed to rotate relative to the collar 31. Thus, the rotational force of the driving-side rotator 35 is transmitted to the driven-side rotator 29 through the protrusions 42, so that the driven-side rotator 29 is rotated along with the driving-side rotator 35. As a result, the worm shaft 23 is rotated, and the and the worm wheel 24 and the output shaft 25 are rotated synchronously with the rotation and the output shaft 23. Therefore, the window regulator connected to the output shaft 25 is activated to raise or lower the window glass.

Figure 12:
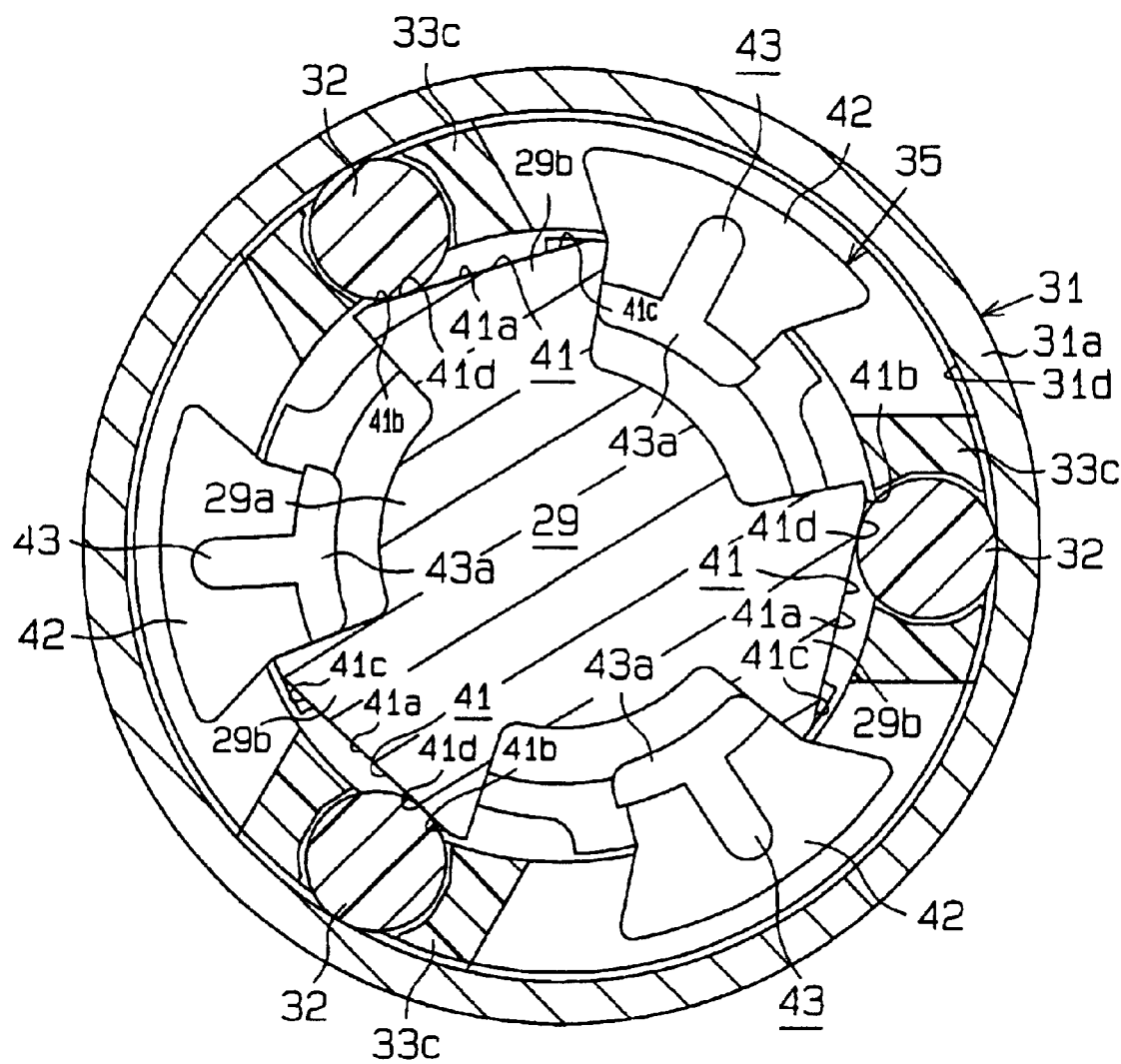
FIG. 12 is another schematic cross sectional view showing the operation of the clutch.

When the motor 1 is not actuated, a load applied to the output shaft 25 from the load side (window glass side) causes the driven-side rotator 29 (worm shaft 23) to rotate. Then, when the driven-side rotator 29 is rotated in the clockwise direction (the direction of the arrow Y) in FIG. 10, each rolling element 32 moves toward the circumferential end 41b of the control surface 41 of the corresponding engaging projection 29b. Thereafter, as shown in FIG. 12, when the rolling element 32 reaches the intermediate portion 41d, the rolling element 32 is clamed between the control surface 41 and the inner peripheral surface 31d of the collar 31 (locked state). Since the outer ring 31a is secured, the driven-side rotator 29 cannot be rotated further, so that the driving-side rotator 35 cannot be rotated by the driven-side rotator 29.

On the other hand, when the driven-side rotator 29 is rotated by the above load in the counter-clockwise direction (the direction of the arrow X) in FIG. 10, each rolling element 32 moves toward the circumferential end 41c of the control surface 41 of the corresponding engaging projection 29b. Then, when the rolling element 32 reaches the intermediate portion 41d, the rolling element 32 is clamped between the control surface 41 and the inner peripheral surface 31d of the collar 31a (locked state). Since the outer ring 31a is secured, the driven-side rotator 29 cannot be rotated further, so that the driving-side rotator 35 cannot be rotated by the driven-side rotator 29.

As described above, even if the relatively large load is applied to the output shaft 25 from the load side (window glass side), the rotation of the driven-side rotator 29 is prevented. Thus, the window glass, which is connected to the output shaft 25, is effectively prevented from moving upward and downward by its own weight or an external force.

At an assembling operation of the motor 1 of the power window system, when the yoke 4, which has the armature 7, the brush holder 9 and the other components installed therein, is connected to the gear housing 21, which has the worm shaft 23 and the other components installed therein, the clutch 20 is assembled. More specifically, with reference to FIG. 9, the driving-side rotator 35 is previously installed to the rotatable shaft 6, and the components of the clutch 20 other than the driving-side rotator 35 are previously installed in the gear housing 21. When the yoke 4 and the gear housing 21 are connected together, the driving-side rotator 35 is placed in a predetermined position relative to the driven-side rotator 29, the support member 33 and the like, and thus the assembly of the clutch 20 is completed.

Even if the misalignment between the rotational axis of the driving-side rotator 35 and the rotational axis of the rotatable shaft 6 (e.g., the tilt of the rotational axis of the rotatable shaft 6 relative to the rotational axis of the driving-side rotator 35, or the radial displacement of the rotational axis of the rotatable shaft 6 relative to the rotational axis of the driving-side rotator 35, which extends parallel to the rotational axis of the rotatable shaft 6) occurs at the time of assembly of the motor, for example, due to the manufacturing error of each corresponding connecting portion, the misalignment is permitted since the sizes of the corresponding components are selected to allow the loose fit of the connecting portion 6a of the rotatable shaft 6 within the connecting hole 35e of the driving-side rotator 35. Thus, the application of the relatively large radial loads to the connection between the driving-side rotator 35 and the rotatable shaft 6 is restrained. Furthermore, even if the worm shaft 23 is flexed during its rotation to cause the tilt of the driving-side rotator 35, which in turn results in the misalignment between the rotational axis of the driving-side rotator 35 and the rotational axis of the rotatable shaft 6, the application of the relatively large radial loads to the connection between the driving-side rotator 35 and the rotatable shaft 6 is also effectively restrained. As a result, generation of the relatively large noises and vibrations at the connection between the driving-side rotator 35 and the rotatable shaft 6 during the rotation is effectively restrained.

Figure 9:
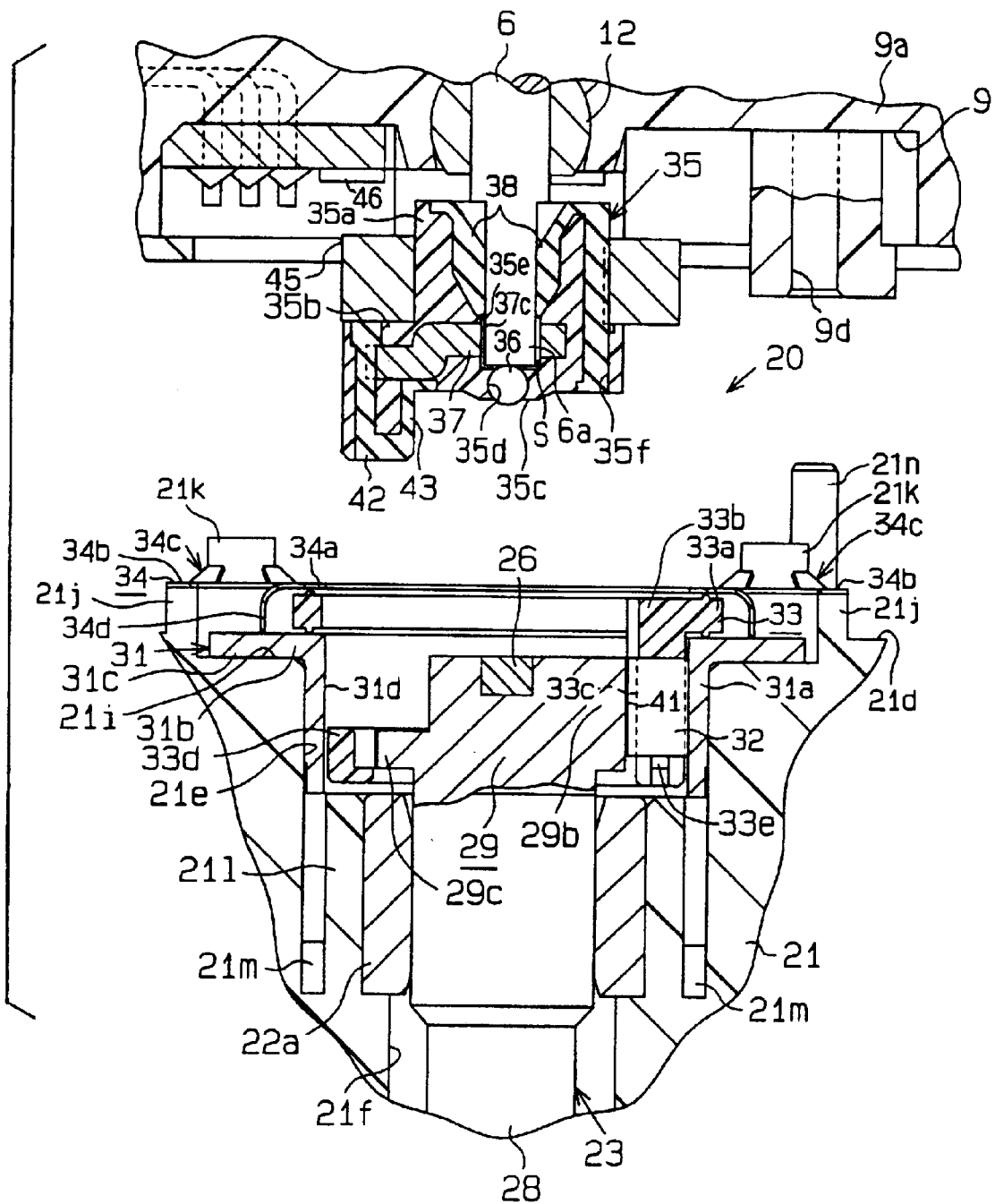
FIG. 9 is a schematic partial cross sectional view showing assembly of the clutch of the motor.

Furthermore, although the connecting portion 6a of the rotatable shaft 6 is loosely fitted within the connecting hole 35e of the driving-side rotator 35, the driving-side rotator 35 is resiliently held around the rotatable shaft 6 by the resilient holding portion 38 provided at the connecting hole 35e to restrain the driving-side rotator 35 from falling off the rotatable shaft 6. Thus, in the assembling operation, even when the driving-side rotator 35 is installed around the lower end of the rotatable shaft 6, as shown in FIG. 9, or even when centrifugal force is applied to the driving-side rotator 35 in a direction of pulling the driving-side rotator 35 out of the rotatable shaft 6, the driving-side rotator 35 is effectively held around the rotatable shaft 6 without causing falling off of the driving-side rotator 35 from the rotatable shaft 6. Thus, the assembling operation of the motor 1 is accelerated.

The above embodiment provides the following advantages.

(1) The connecting portion 6a of the rotatable shaft 6 is connected to the connecting hole 35e of the driving-side rotator 35, which includes the two diametrically opposing flat inner wall surfaces, by loosely fitting the connecting portion 6a within the connecting hole 35e in a manner that allows integral rotation of the rotatable shaft 6 with the driving-side rotator 35. Thus, the certain amount of misalignment between the rotational axis of the rotatable shaft 6 and the rotational axis of the driving-side rotator 35, which is caused, for example, by the manufacturing error of each corresponding connecting portion, is permitted at the time of the assembly. As a result, the application of the relatively large radial loads to the connection between the driving-side rotator 35 and the rotatable shaft 6 can be restrained. Furthermore, even when the worm shaft 23 is flexed during its rotation to cause the tilt of the driving-side rotator 35, which in turn results in the misalignment between the rotational axis of the driving-side rotator 35 and the rotational axis of the rotatable shaft 6, the application of the relatively large radial loads to the connection between the driving-side rotator 35 and the rotatable shaft 6 is effectively restrained. As a result, generation of the relatively large noises and the vibrations from the connection between the driving-side rotator 35 and the rotatable shaft 6 during the rotation is effectively restrained.

(2) The driving-side rotator 35 is produced by the resin molding, and the metal plate 37 having the connecting hole 37c is insert molded within the driving-side rotator 35. The connecting hole 37c of the metal plate 37 is disposed in the connecting hole 35e of the driving-side rotator 35 and has the cross sectional shape substantially coinciding with the cross sectional shape of the connecting hole 35e to directly engage with the connecting portion 6a of the rotatable shaft 6 in the rotational direction. Since the connecting hole 37c of the metal plate 37 is constructed to engage with the rotatable shaft 6 in the rotational direction, the rigidity of the connection between the driving-side rotator 35 and the rotatable shaft 6 is increased in comparison to the driving-side rotator entirely made of the resin material. As a result, the axial size of the connection (connecting hole 35e) of the driving-side rotator 35 can be reduced, allowing a reduction in the axial size of the driving-side rotator 35. Furthermore, the reduction in the axial size of the connection (connecting hole 35e) of the driving-side rotator 35 allows an increase in the allowed tilt angle of the rotatable shaft 6 relative to the driving-side rotator 35. Thus, even when the tilt angle of the rotatable shaft 6 is relatively large, it is relatively easy to counteract this. Furthermore, since the metal plate 37 is insert molded within the driving-side rotator 35, a separate assembling operation of the metal plate 37 to the driving-side rotator 35 is not required.

(3) The driving-side rotator 35 has the resilient holding portion 38, which resiliently holds the driving-side rotator 35 about the rotatable shaft 6 to restrain the driving-side rotator 35 from falling off the rotatable shaft 6 at the time of assembly. That is, the connecting hole 35e of the driving-side rotator 35 is constructed to loose fit with the rotatable shaft 6 (connecting portion 6a) to permit the certain amount of the misalignment between the rotational axis of the rotatable shaft 6 and the rotational axis of the driving-side rotator 35. If the resilient holding portion 38 is not provided, the driving-side rotator 35 falls off the rotatable shaft 6 in the assembling operation, for example, when the connecting portion 6a of the rotatable shaft 6 is oriented downwardly, or when the centrifugal force is applied to the driving-side rotator 35 in the direction of pulling the driving-side rotator 35 out of the rotatable shaft 6. Thus, the resilient holding portion 38 restrains the fall of the driving-side rotator 35 from the rotatable shaft 6, allowing more freedom in the assembling operation of the motor 1. Since the resilient holding portion 38 is integrally molded to the driving-side rotator 35, the assembling operation of the resilient holding portion 38 to the driving-side rotator 35 is not required. Furthermore, generation of relatively large vibrations between the rotatable shaft 6 and the driving-side rotator 35 during the rotation of the motor 1 can be restrained by the resilient holding force of the resilient holding portion 38.

(4) Each of the connecting portion 6a of the rotatable shaft 6 and the connecting hole 35e of the driving-side rotator 35 has the diametrically opposing flat wall surfaces. Thus, the connecting portion 6a and the connecting hole 35e can be relatively easily manufactured. Furthermore, the engagement between the connecting portion 6a of the rotatable shaft 6 and the connecting hole 35e of the driving-side rotator 35 can be enhanced in the rotational direction due to the fact that the connecting portion 6a and the connecting hole 35e engage with each other at the two points in the rotational direction.

(5) The connecting portion 6a of the rotatable shaft 6 is formed as the projection. Thus, the connection between the rotatable shaft 6 and the driving-side rotator 35 can be easily manufactured. Particularly, since the connecting portion 6a is formed at the end of the axially elongated rotatable shaft 6, the connecting portion 6a in the form of the projection can be relatively easily formed.

(6) The positioning means in the form of the positioning holes 9d and the positioning projections 21n is arranged between the brush holder 9, which supports the rotatable shaft 6, and the gear housing 21, which supports the worm shaft 23. The brush holder 9 and the gear housing 21 are directly positioned relative to each other by the positioning means. As a result, accumulation of the errors between the rotatable shaft 6 and the worm shaft 23 is reduced, thus effectively restraining the misalignment between the rotational axis of the rotatable shaft 6 and the rotational axis of the worm shaft 23 (e.g., tilt of one of the rotational axis of the rotatable shaft 6 and the rotational axis of the worm shaft 23 relative to the other, or the radial displacement between the rotational axis of the rotatable shaft 6 and the rotational axis of the worm shaft 23, which extend parallel to each other). Therefore, application of relatively large radial loads at the connection between the rotatable shaft 6 and the clutch 20 (driving-side rotator 35) can be restrained to restrain generation of the relatively large noises and vibrations at the connection between the rotatable shaft 6 and the clutch 20 (driving-side rotator 35).

(7) The positioning means in the form of the positioning holes 9d and the positioning projections 21n is arranged radially inward of the clamp portion 9c of the brush holder 9, which is clamped between the yoke housing 4 and the gear housing 21. Thus, the positioning means is not disposed outside of these housings 4, 21. As a result, it is not necessary to provide a dedicated waterproof structure to the positioning means.

(8) The relative positioning between the brush holder 9 and the gear housing 21 is carried out by engaging the positioning holes 9d to the positioning projections 21n, respectively. Thus, the positioning means can be easily implemented.

(9) The two positioning projections 21n and the two positioning holes 9d are arranged. Thus, the brush holder 9 and the gear housing 21 can be more accurately positioned relative to each other. As a result, the misalignment between the rotational axis of the rotatable shaft 6 and the rotational axis of the worm shaft 23 can be minimized.

(10) The two positioning projections 21n are symmetrically arranged about the rotatable shaft 6 at the opposite diagonal corners, and the two positioning holes 9d are symmetrically arranged about the rotatable shaft 6 at the diagonal corners. Thus, the brush holder 9 and the gear housing 21 can be more accurately positioned relative to each other. As a result, the misalignment between the rotational axis of the rotatable shaft 6 and the rotational axis of the worm shaft 23 can be minimized.

The above embodiment can be modified as follows.

In the above embodiment, each of the connecting portion 6a of the rotatable shaft 6 and the connecting hole 35e of the driving-side rotator 35 has the diametrically opposing flat wall surfaces. However, the cross section of each of the connecting portion 6a of the rotatable shaft 6 and the connecting hole 35e of the driving-side rotator 35 can have any other shape, such as a polygonal shape (e.g., a quadrangular shape, a hexagonal shape), which allows engagement between the connecting portion 6a of the rotatable shaft 6 and the connecting hole 35e of the driving-side rotator 35 in the rotational direction.

Figure 13:
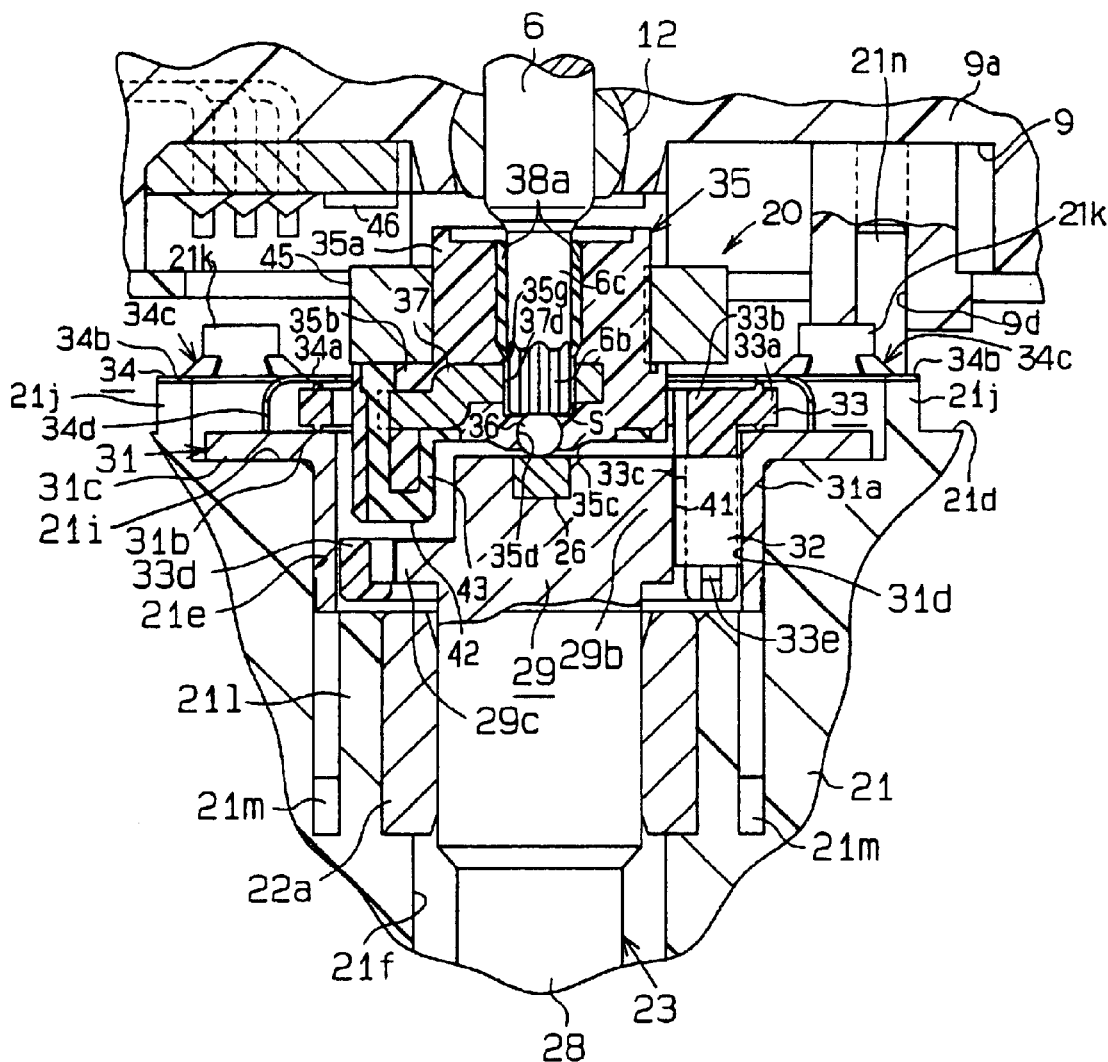
FIG. 13 is a partial enlarged cross sectional view showing a modification of the motor.
Figure 14:
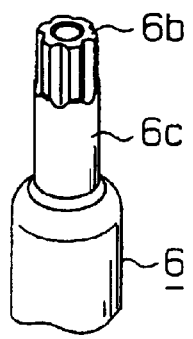
FIG. 14 is a partial perspective view of a rotatable shaft of the motor shown in FIG. 13.

Furthermore, as shown in FIGS. 13 and 14, the connecting portion 6b of the rotatable shaft 6 can have a star shaped cross section. That is, the connecting portion 6b has six radially extending projections, and each projection has a trapezoidal cross section. Also, the connecting hole 35g of the driving-side rotator 35 has a corresponding star shaped cross section (the connecting hole 37*d* of the metal plate 37 also has the corresponding star shaped cross section). Similar to the above embodiment, the connecting hole 35*g* of the driving-side rotator 35 and the connecting portion 6*b* of the rotatable shaft 6 are sized such that the connecting hole 35*g* and the connecting portion 6*b* are loosely fitted together (providing a space S between the connecting hole 35*g* and the connecting portion 6*b*). That is, similar to the above embodiment, a certain amount of misalignment between the rotational axis of the rotatable shaft 6 and the rotational axis of the driving-side rotator 35 is permitted. Furthermore, the connecting portion 6*b* having the star shaped cross section achieves the rigidity higher than that of the connecting portion 6*b* having the diametrically opposing flat wall surfaces. Thus, when the output power of the motor 1 (motor main body 2) is increased, use of the star shaped connecting portion 6*b* is preferred.

In the example shown in FIGS. 13 and 14, a cylindrical portion 6*c* extends continuously from the connecting portion 6*b* in the rotatable shaft 6. The resilient holding portion 38*a* of the driving-side rotator 35 is closely engaged with and is resiliently held around the cylindrical portion 6*c* to restrain falling off of the driving-side rotator 35 from the rotatable shaft 6. In this case, the resilient holding portion 38*a* is closely engaged with the entire circumference of the cylindrical portion 6*c*, so that the relatively large resilient holding force can be achieved to restrain the falling off of the driving-side rotator 35 from the rotatable shaft 6.

Figure 15A:
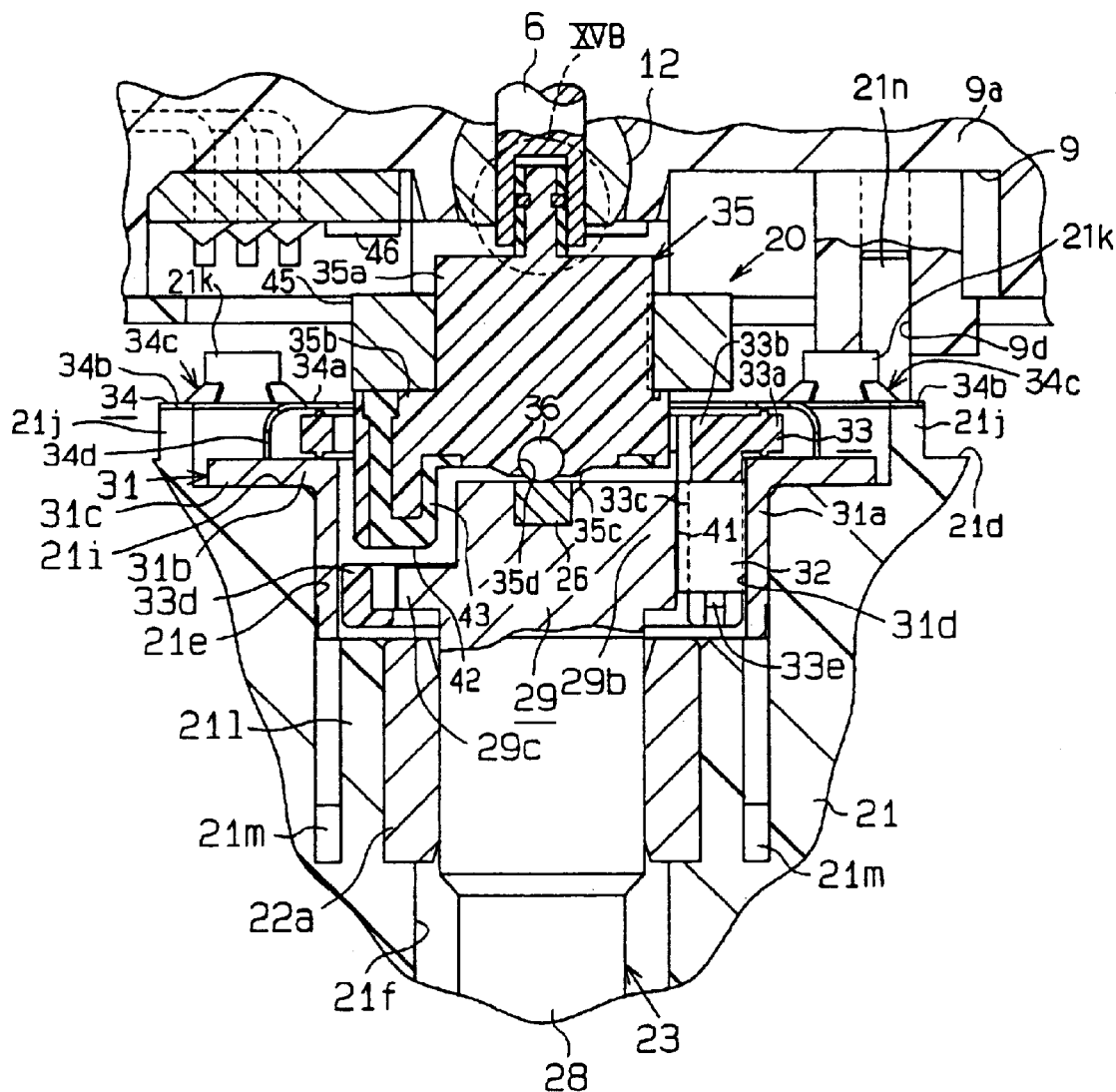
FIG. 15A is an enlarged cross sectional view showing another modification of the motor.
Figure 15B:
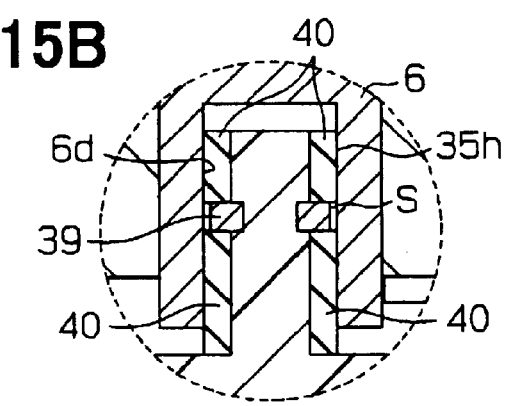
FIG. 15B is an enlarged view of a section XVB in FIG. 15A.

Furthermore, as shown in FIGS. 15A and 15B, a connecting recess 6*d* can be formed at the distal end surface of the rotatable shaft 6, and a connecting projection 35*h* for engaging with the connecting recess 6*d* can be formed in the driving-side rotator 35. The connecting recess 6d and the connecting projection 35*h* can have the diametrically opposed flat wall surfaces or can have the polygonal cross section (e.g., the quadrangular shape, the hexagonal shape) or the star shape cross section to engage with each other in the rotational direction in a manner similar to that described above.

Furthermore, like the majority of the rest of the driving-side rotator 35, a central core portion of the connecting projection 35*h* is made of the resin material. Also, a metal plate 39 is secured to an axially middle part of the connecting projection 35*h* to directly engage with the connecting recess 6*d* of the rotatable shaft 6 in the rotational direction. The metal plate 39 has a cross sectional shape, which corresponds to that of the connecting recess 6*d* of the rotatable shaft 6. Similar to the above embodiment, the metal plate 39 and the connecting recess 6*d* are sized such that the metal plate 39 is loosely fitted within the connecting recess 6*d* of the rotatable shaft 6, thereby forming a space S therebetween. A resilient holding portion 40 is integrally formed around the connecting projection 35*h* except the metal plate 39. The resilient holding portion 40 is closely engaged with an inner wall of the connecting recess 6*d* of the rotatable shaft 6 to resiliently hold the driving-side rotator 35 around the rotatable shaft 6 to restrain the driving-side rotator 35 from falling off the rotatable shaft 6 at the time of assembly of the motor 1.

In the modification shown in FIG. 15, similar to the above embodiment, when the misalignment between the rotational axis of the rotatable shaft 6 and the rotational axis of the driving-side rotator 35 occurs at the time of assembly of the motor 1, the misalignment is permitted due to the fact that the metal plate 39 of the connecting projection 35*h* is loosely fitted within the connecting recess 6*d* of the rotatable shaft 6.

Figure 16:
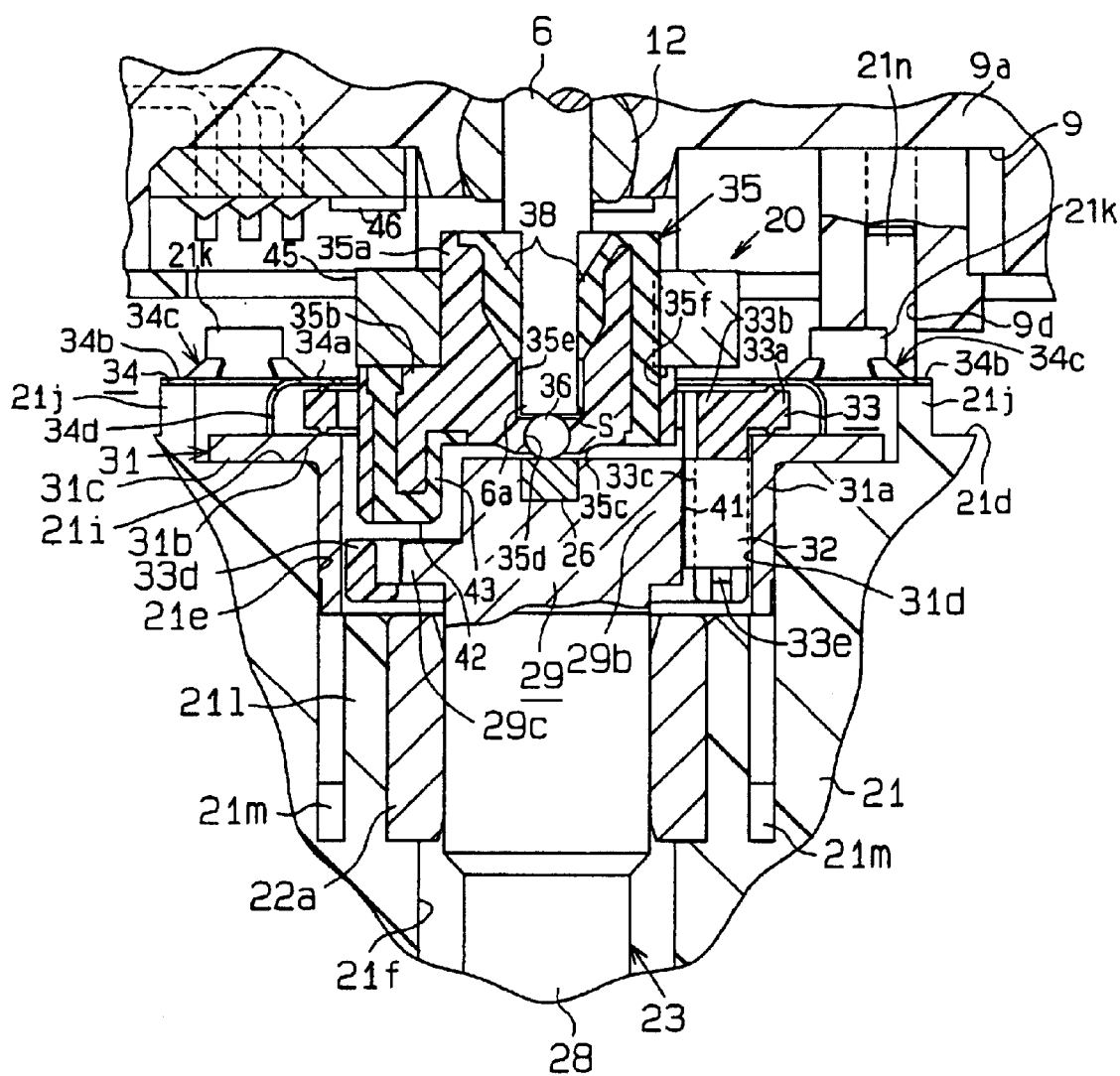
FIG. 16 is an enlarged cross sectional view showing a further modification of the motor.
Figure 17:
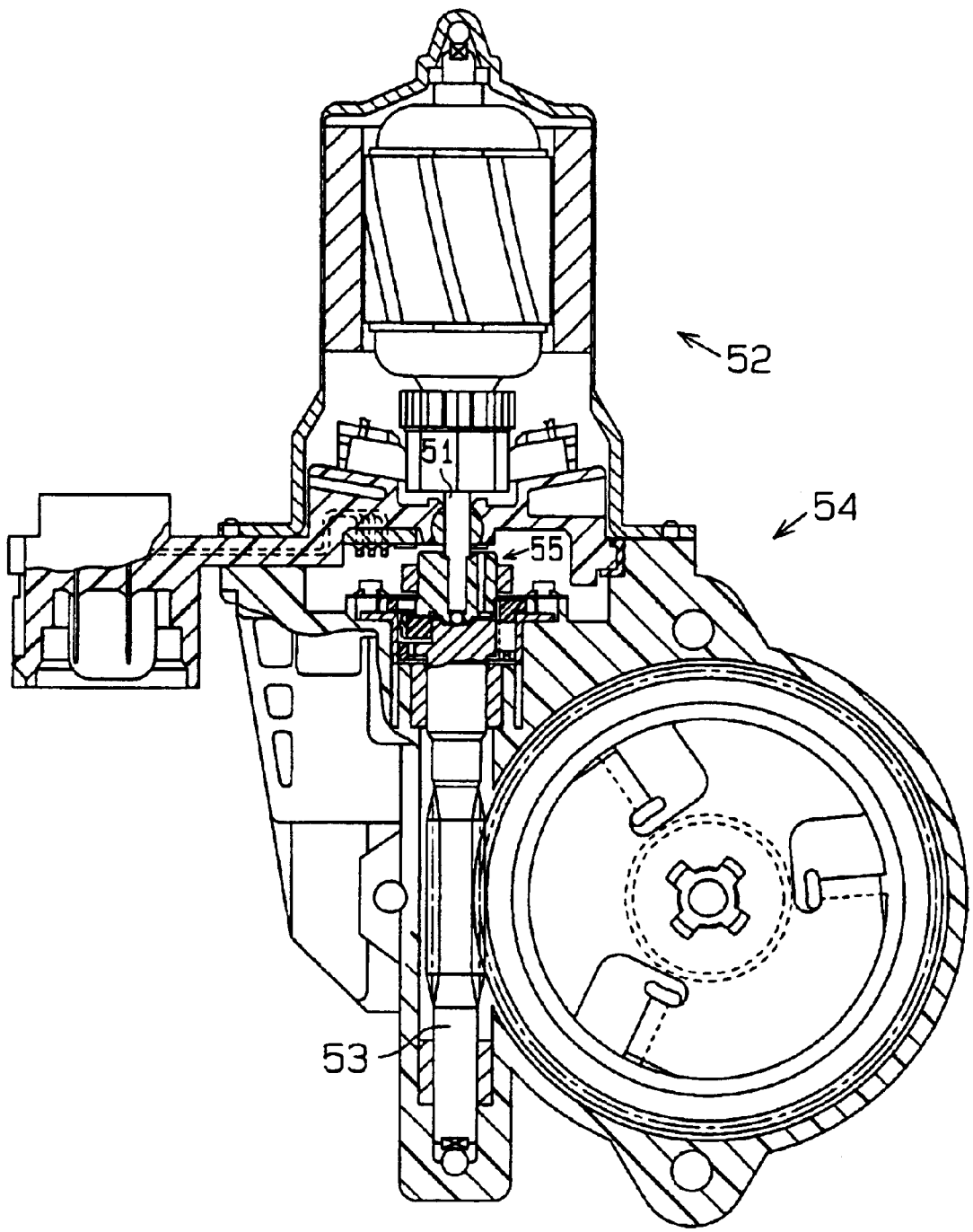
FIG. 17 is a cross sectional view of a previously proposed motor.
Figure 18:
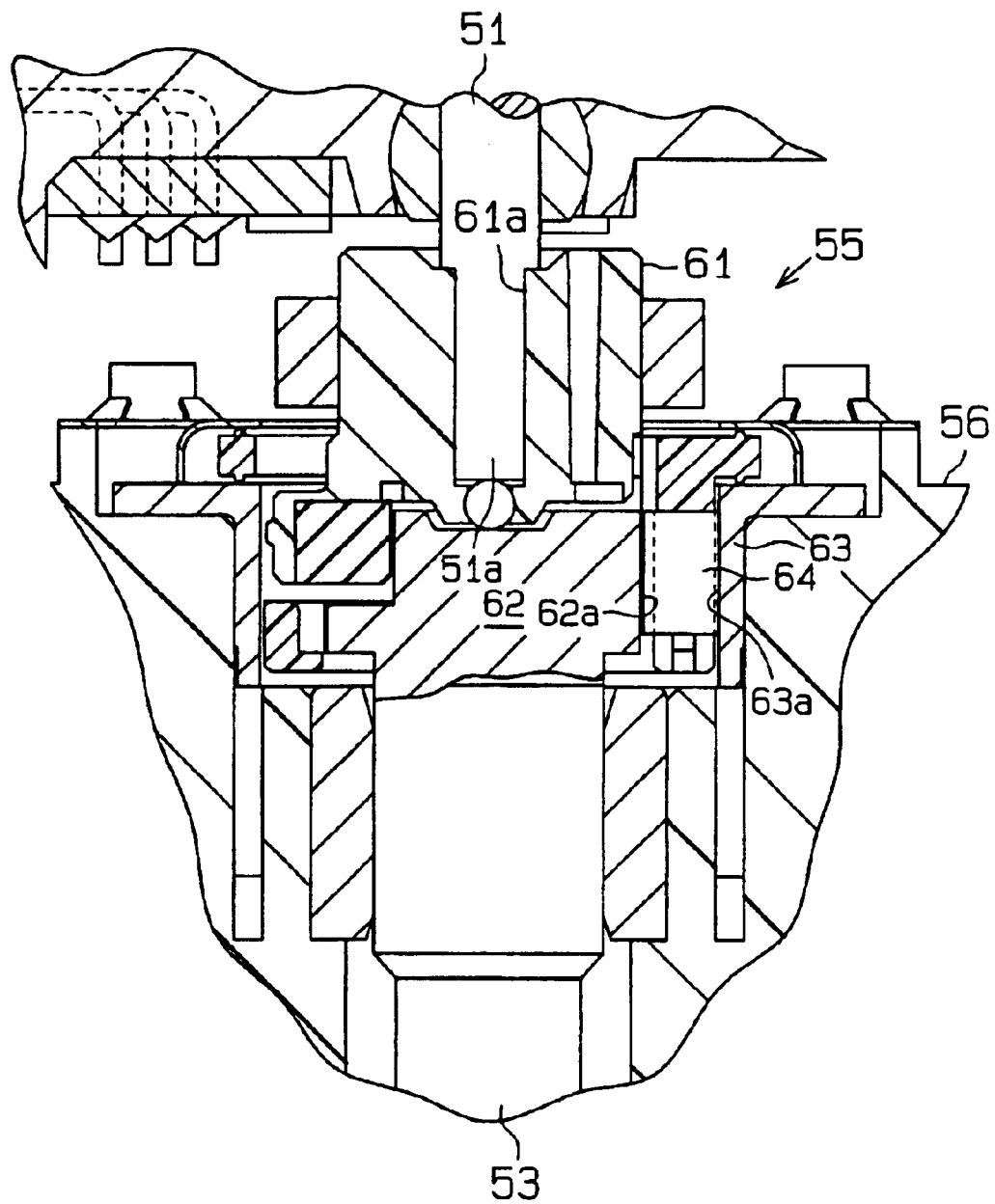
FIG. 18 is a partial enlarged view of the motor shown in FIG. 17.

The modification of the shape of the metal plate 37 is not limited to the above metal plate 39, and metal plate 37 can be further modified in any appropriate form. Furthermore, in the above embodiment, the metal plate 37 is insert molded within the driving-side rotator 35. However, the metal plate 37 can be separately manufactured from the driving-side rotator 35 and can be assembled to the driving-side rotator 35. Furthermore, if the resin material of the driving-side rotator 35 has an enough rigidity, the metal plate 37 can be eliminated, as shown in FIG. 16.

The shape and the material of the resilient holding portion 38 of the above embodiment are not limited to ones described above and can be changed to any ones. Furthermore, the resilient holding portion 38 is integrally molded in the driving-side rotator 35 in the above embodiment. However, the resilient holding portion 38 can be manufactured separately from the driving-side rotator 35 and can be assembled to the driving-side rotator 35. Furthermore, a resilient holding portion can be provided in the rotatable shaft 6. Also, if there is no possibility for the driving-side rotator 35 to fall off the rotatable shaft 6 during the assembly (for example, in a case where the connecting portion 6*a* is upwardly oriented, and the driving-side rotator 35 is installed to the upwardly oriented connecting portion 6*a*), the resilient holding portion 38 can be eliminated.

In the above embodiment, the driven-side rotator 29 is integrally formed with the worm shaft 23. However, the driven-side rotator 29 can be formed separately from the worm shaft 23 and can be assembled to the worm shaft 23.

In the above embodiment, the positioning means for positioning the brush holder 9 and the gear housing 21 relative to each other includes the positioning holes 9*d* and the positioning projections 21*n*. The shapes, the positions and the number of the positioning holes 9*d* and the positioning projections 21*n* can be changed to any appropriate ones.

For example, in the above embodiment, the positioning holes 9*d* are provided in the brush holder 9, and the positioning projections 21*n* are provided in the gear housing 21. Alternatively, the positioning projections can be provided in the brush holder 9, and the positioning holes can be provided in the gear housing 21.

Furthermore, in the above embodiment, the number of the positioning holes 9*d* is two, and the number of the positioning projections 21*n* is two. Alternatively, only one positioning hole 9*d* and the corresponding one positioning projection 21*n* can be provided. Also, more than two positioning holes 9*d* and the corresponding number of the positioning projections 21*n* can be provided.

In the above embodiment, each positioning hole 9*d* has the circular cross section, and each positioning projection 21*n* has the cylindrical shape. Alternatively, each positioning hole 9*d* can have a polygonal cross section, and each positioning projection 21*n* can have a polygonal projection.

In the above embodiment, the positioning projections 21*n* are symmetrically arranged about the rotatable shaft 6 at the diagonal corners, and the positioning holes 9*d* are also symmetrically arranged about the rotatable shaft 6 in opposed relationship to the corresponding positioning projections 21*n*. Alternatively, the positioning projections 21*n* can be symmetrically arranged about the rotatable shaft 6 at any positions generally along the longitudinal direction of the cross section of the elongated open end of the housing 21, and the positioning holes 9*d* can be also symmetrically arranged about the rotatable shaft 6 in opposed relationship to the corresponding positioning projections 21*n*.

The structure of the clutch 20 of the above embodiment can be modified in any appropriate manner. For example, in the above embodiment, the clutch 20 is constructed such that each rolling element 32 is clamped between the corresponding control surface 41 of the driven-side rotator 29 and the inner peripheral surface 31d of the collar 31 to lock the driven-side rotator 29, thereby preventing transmission of the rotational force from the load side to the driving-side rotator 35 through the driven-side rotator 29. Alternatively, the clutch can be constructed such that the rotation of the driven-side rotator 29 is allowed while predetermined frictional force is applied to the driven-side rotator 29 from the inner peripheral surface 31d of the collar 31 and each rolling element 32, which is clamped between the corresponding control surface 41 of the driven-side rotator 29 and the inner peripheral surface 31d of the collar 31.

In the above embodiment, the clutch 20 is used as the coupling means for drivingly coupling the rotatable shaft 6 to the worm shaft 23. In place of the clutch 20, any other coupling means for drivingly coupling the rotatable shaft 6 to the worm shaft 23 can be used.

The structures of the motor main body 2 and the speed reducing unit 3 of the above embodiment can be modified in any appropriate manner.

In the above embodiment, the motor 1 is used as the drive source of the power window system. The motor 1 can be used as a drive source of any other devices and systems.

Additional advantages and modifications will readily occur to those skilled in the art. The invention in its broader terms is therefore, not limited to the specific details, representative apparatus, and illustrative examples shown and described.

What is claimed is:

1. A motor comprising:
   a motor main body, which includes a rotatable shaft and rotates the rotatable shaft;
   a speed reducing unit, which is connected to the motor main body and includes a worm shaft, wherein the worm shaft is substantially coaxial with the rotatable shaft; and
   a coupling means for coupling the rotatable shaft with the worm shaft, wherein the coupling means includes:
      a driving-side rotator, which is connected with the rotatable shaft to rotate integrally with the rotatable shaft; and
      a driven-side rotator, which is connected with the worm shaft to rotate integrally with the worm shaft and is engageable with the driving-side rotator in a rotational direction, wherein:
         the rotatable shaft includes a connecting portion;
         the driving-side rotator includes a connecting portion, which is loosely fitted with the connecting portion of the rotatable shaft and is engageable with the connecting portion of the rotatable shaft in the rotational direction to rotate integrally with the connecting portion of the rotatable shaft;
         the connecting portion of the driving-side rotator is a connecting hole, within which the connecting portion of the rotatable shaft is loosely fitted; and
         at least a portion of the connecting portion of the rotatable shaft is radially spaced from an inner wall surface of the connecting hole of the driving-side rotator.

2. A motor according to claim 1, wherein:
   the driving-side rotator is made by resin molding; and
   the driving-side rotator further includes a metal plate, which is integrally formed with the connecting portion of the driving-side rotator and is directly engageable with the connecting portion of the rotatable shaft in the rotational direction to rotate integrally with the connecting portion of the rotatable shaft.

3. A motor according to claim 2, wherein the metal plate is insert molded in the driving-side rotator.

4. A motor according to claim 3, wherein:
   the driving-side rotator further includes:
      a disk portion; and
      a plurality of protrusions, which extend radially outwardly from the disk portion and are arranged at substantially equal angular intervals; and
   the metal plate includes:
      a disk portion, which is insert molded within the disk portion of the driving-side rotator; and
      a plurality of arm portions, each of which is insert molded within a corresponding one of the plurality of protrusions.

5. A motor according to claim 2, wherein:
   the connecting portion of the driving-side rotator is a connecting hole, within which the connecting portion of the rotatable shaft is loosely fitted; and
   the metal plate includes an engaging hole, which has a cross sectional shape substantially corresponding to that of the connecting hole of the driving-side rotator and is disposed in the connecting hole of the driving-side rotator to directly engage with the connecting portion of the rotatable shaft in the rotational direction to rotate integrally with the connecting portion of the rotatable shaft.

6. A motor according to claim 1, wherein the driving-side rotator further includes a resilient holding portion for resiliently holding the driving-side rotator around the rotatable shaft.

7. A motor according to claim 6, wherein the resilient holding portion is integrally molded to the driving-side rotator.

8. A motor according to claim 6, wherein:
   the connecting portion of the driving-side rotator is a connecting hole, within which the connecting portion of the rotatable shaft is loosely fitted;
   the connecting hole of the driving-side rotator has two opposing flat inner wall surfaces;
   the connecting portion of the rotatable shaft has two opposing flat outer wall surfaces; and
   the resilient holding portion of the driving-side rotator is resiliently engaged with the two opposing flat outer wall surfaces of the connecting portion of the rotatable shaft.

9. A motor according to claim 6, wherein:
   the driving-side rotator includes a plurality of cushion members, which are engaged with the driven-side rotator in a rotational direction of the driving-side rotator when the driving-side rotator is rotated; and
   the resilient holding portion of the driving-side rotator is made from the same material as that of the plurality of cushion members of the driving-side rotator.

10. A motor according to claim 6, wherein:
    the driving-side rotator includes a plurality of cushion members, which are engaged with the driven-side rotator in a rotational direction of the driving-side rotator when the driving-side rotator is rotated; and
    the resilient holding portion of the driving-side rotator and the plurality of cushion members of the driving-side rotator are integrally formed.

11. A motor according to claim 6, wherein the resilient holding portion of the driving-side rotator resiliently holds the driving-side rotator around the rotatable shaft, so that the driving-side rotator is restrained from falling off the rotatable shaft during assembly of the motor.

12. A motor according to claim 6, wherein the resilient holding portion of the driving-side rotator resiliently holds the driving-side rotator around the rotatable shaft, so that generation of vibrations between the rotatable shaft and the driving-side rotator during rotation of the rotatable shaft and the driving-side rotator is restrained.

13. A motor according to claim 1, wherein:
the coupling means is a clutch;
the clutch transmits rotational force of the rotatable shaft to the worm shaft through the driving-side rotator and the driven-side rotator; and
the clutch prevents transmission of rotational force of the worm shaft from the driven-side rotator to the driving-side rotator.

14. A motor according to claim 1, wherein:
the coupling means is a clutch;
the clutch transmits rotational force of the rotatable shaft to the worm shaft through the driving-side rotator and the driven-side rotator; and
the clutch transmits rotational force of the worm shaft from the driven-side rotator to the driving-side rotator while exerting a predetermined frictional force in the driven-side rotator.

15. A motor according to claim 1, wherein the coupling means further includes a ball, which is engaged with the rotatable and the worm shaft.

16. A motor according to claim 15, wherein:
the worm shaft includes a contact member, which has a rigidity higher than that of the rest of the worm shaft; and
the ball is engaged with the worm shaft through the contact member.

17. A motor according to claim 15, wherein the driving-side rotator includes a ball holding portion, which holds the ball.

18. A motor according to claim 1, wherein:
the connecting portion of the driving-side rotator is a connecting hole, within which the connecting portion of the rotatable shaft is loosely fitted;
the connecting hole of the driving-side rotator has two opposing flat inner wall surfaces; and
the connecting portion of the rotatable shaft has two opposing flat outer wall surfaces.

19. A motor according to claim 1, wherein:
the connecting portion of the driving-side rotator is a connecting hole, within which the connecting portion of the rotatable shaft is loosely fitted;
the connecting hole of the driving-side rotator has a star shaped cross section; and
the connecting portion of the rotatable shaft has a star shaped cross section.

20. A motor according to claim 19, wherein:
the driving-side rotator further includes a resilient holding portion for resiliently holding the driving-side rotator around the rotatable shaft;
the rotatable shaft includes a cylindrical portion, which extends continuously from the connecting portion of the rotatable shaft; and
the resilient holding portion of the driving-side rotator is resiliently engaged with the cylindrical portion of the rotatable shaft.

21. A motor according to claim 1, further comprising:
a sensor magnet, which is secured to the driving-side rotator to rotate integrally with the driving-side rotator; and
a magnetic sensing element, which is arranged adjacent to the sensor magnet and measures a change in magnetic field during rotation of the sensor magnet.

22. A motor according to claim 1, wherein:
the driving-side rotator has an open end, through which the connecting portion of the rotatable shaft is loosely fitted into the driving-side rotator; and
a cross sectional size of the open end of the driving-side rotator decreases in a direction away from the motor main body.

23. A motor according to claim 1, wherein:
the motor main body further includes a yoke housing, which rotatably receives an armature, wherein the armature includes the rotatable shaft and a commutator;
the motor further includes a brush holder, which is placed in an opening of the yoke housing, wherein the brush holder holds a plurality of brushes in sliding contact with the commutator and includes a bearing, which rotatably supports the rotatable shaft;
the speed reducing unit further includes a gear housing connected to the yoke housing in such a manner that the brush holder is arranged between an opening of the gear housing and the opening of the yoke housing, wherein the gear housing rotatably receives the worm shaft; and
the motor further includes a positioning means for positioning the brush holder and the gear housing relative to each other, wherein the positioning means is placed between the brush holder and the gear housing.

24. A motor according to claim 23, wherein:
the brush holder includes a clamp portion, which is clamped between the opening of the gear housing and the opening of the yoke housing along substantially an entire inner perimeter of the opening of the yoke housing; and
the positioning means is positioned radially inward of the clamp portion.

25. A motor according to claim 23, wherein the positioning means includes:
at least one positioning projection, which is provided in one of the brush holder and the gear housing; and
at least one positioning hole, which is provided in the other of the brush holder and the gear housing and is engaged with the at least one positioning projection.

26. A motor according to claim 25, wherein:
the at least one positioning projection includes two or more positioning projections; and
the at least one positioning hole includes two or more positioning holes.

27. A motor according to claim 23, wherein:
the coupling means is a clutch;
the clutch transmits rotational force of the rotatable shaft to the worm shaft through the driving-side rotator and the driven-side rotator; and
the clutch prevents transmission of rotational force of the worm shaft from the driven-side rotator to the driving-side rotator.

28. A motor according to claim 23, wherein:
the coupling means is a clutch;
the clutch transmits rotational force of the rotatable shaft to the worm shaft through the driving-side rotator and the driven-side rotator; and the clutch transmits rotational force of the worm shaft from the driven-side rotator to the driving-side rotator while exerting a predetermined frictional force in the driven-side rotator.

29. A motor comprising:
a motor main body, which includes a rotatable shaft and rotates the rotatable shaft;
a speed reducing unit, which is connected to the motor main body and includes a worm shaft, wherein the worm shaft is substantially coaxial with the rotatable shaft; and
a coupling means for coupling the rotatable shaft with the worm shaft, wherein the coupling means includes:
  a driving-side rotator, which is connected with the rotatable shaft to rotate integrally with the rotatable shaft; and
  a driven-side rotator, which is connected with the worm shaft to rotate integrally with the worm shaft and is engageable with the driving-side rotator in a rotational direction, wherein:
  the rotatable shalt includes a connecting portion; and
  the driving-side rotator includes a connecting portion, which is loosely fitted with the connecting portion of the rotatable shaft and is engageable with the connecting portion of the rotatable shaft in the rotational direction to rotate integrally with the connecting portion of the rotatable shaft; and
  the driving-side rotator further includes a resilient holding portion for resiliently holding the driving-side rotator around the rotatable shaft.

* * * * *